(12) United States Patent
Zhou et al.

(10) Patent No.: US 10,848,668 B2
(45) Date of Patent: Nov. 24, 2020

(54) 360 DEGREE VIDEO RECORDING AND PLAYBACK WITH OBJECT TRACKING

(71) Applicant: Avago Technologies General IP (Singapore) Pte. Ltd., Singapore (SG)

(72) Inventors: Minhua Zhou, San Diego, CA (US); Xuemin Chen, Rancho Santa Fe, CA (US); Brian A. Heng, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 212 days.

(21) Appl. No.: 15/599,446

(22) Filed: May 18, 2017

(65) Prior Publication Data

US 2017/0339341 A1  Nov. 23, 2017

Related U.S. Application Data

(60) Provisional application No. 62/339,040, filed on May 19, 2016, provisional application No. 62/418,061, (Continued)

(51) Int. Cl.
*H04N 5/232* (2006.01)
*H04N 9/82* (2006.01)
(Continued)

(52) U.S. Cl.
CPC ......... *H04N 5/23238* (2013.01); *H04N 5/772* (2013.01); *H04N 9/8042* (2013.01); *H04N 9/8205* (2013.01)

(58) Field of Classification Search
CPC .. H04N 5/23238; H04N 5/772; H04N 9/8042; H04N 9/8205
(Continued)

(56) References Cited

U.S. PATENT DOCUMENTS 9,934,823 B1 * 4/2018 Bentley ............. G11B 27/3081
2002/0074669 A1 6/2002 Watanabe et al.
(Continued)

FOREIGN PATENT DOCUMENTS

EP  2490179  8/2012
JP  2016-031576  3/2016

OTHER PUBLICATIONS

European Office Action from European Patent Application No. 12006331.8, dated Nov. 19, 2018, 6 pages.

*Primary Examiner* — William C Vaughn, Jr.
*Assistant Examiner* — Jae N Noh
(74) *Attorney, Agent, or Firm* — Morgan, Lewis & Bockius LLP

(57) ABSTRACT

In a system for 360 degree video capture and playback, 360 degree video may be captured, stitched, encoded, decoded, rendered, and played-back. In one or more implementations, a decoding device receives a 360 degree video stream as input and decodes the 360 degree video stream, and a memory device stores the 360 degree video stream and viewing history data associated with the 360 degree video stream. A rendering device may render the decoded stream using view angles from the viewing history data. In one or more implementations, an object tracking device tracks one or more objects in the decoded 360 degree video stream and provides one or more tracking angles associated with the objects. The rendering device may render the decoded 360 degree video stream using the one or more tracking angles to keep at least one object in the 360 degree video stream for one or more rendered frames.

12 Claims, 17 Drawing Sheets

Related U.S. Application Data filed on Nov. 4, 2016, provisional application No. 62/418,069, filed on Nov. 4, 2016.

(51) Int. Cl.
*H04N 5/77* (2006.01)
*H04N 9/804* (2006.01)

(58) Field of Classification Search
USPC .......................................................... 348/39
See application file for complete search history.

(56) References Cited

U.S. PATENT DOCUMENTS

| | | |
|---|---|---|
| 2004/0247173 A1 | 12/2004 | Nielsen et al. |
| 2004/0263636 A1* | 12/2004 | Cutler .................... H04N 7/15 348/211.12 |
| 2009/0324010 A1* | 12/2009 | Hou ................ G06K 9/00771 382/103 |
| 2010/0001997 A1 | 1/2010 | Kajikawa |
| 2010/0157016 A1 | 6/2010 | Sylvain |
| 2010/0270667 A1 | 10/2010 | Tong et al. |
| 2012/0307004 A1 | 12/2012 | Budagavi |
| 2013/0202265 A1 | 8/2013 | Arrasvuori et al. |
| 2016/0352791 A1 | 12/2016 | Adams |
| 2016/0353089 A1 | 12/2016 | Gallup |
| 2016/0353090 A1 | 12/2016 | Esteban |
| 2017/0220879 A1 | 8/2017 | Akiyama et al. |
| 2017/0251208 A1 | 8/2017 | Adsumilli |
| 2017/0287200 A1 | 10/2017 | Forutanpour |
| 2017/0301065 A1 | 10/2017 | Adsumilli |
| 2017/0323423 A1 | 11/2017 | Lin |
| 2017/0332107 A1 | 11/2017 | Abbas |
| 2018/0027186 A1* | 1/2018 | Jung ..................... H04N 13/20 348/333.05 |
| 2018/0053280 A1* | 2/2018 | Kim ......................... G06T 3/20 |
| 2018/0174314 A1 | 6/2018 | Bippus |
| 2019/0068879 A1 | 2/2019 | Bao |

\* cited by examiner

360 DEGREE VIDEO RECORDING AND PLAYBACK WITH OBJECT TRACKING

CROSS-REFERENCE TO RELATED APPLICATIONS

The present application claims the benefit of priority under 35 U.S.C. § 119 from U.S. Provisional Patent Application Ser. No. 62/339,040 entitled "360 DEGREE VIDEO CAPTURE AND PLAYBACK," filed on May 19, 2016; U.S. Provisional Patent Application Ser. No. 62/418,061 entitled "RECORDING AND PLAYBACK OF 360 DEGREE VIDEO," filed on Nov. 4, 2016; and U.S. Provisional Patent Application Ser. No. 62/418,069 entitled "OBJECT TRACKING FOR 360 DEGREE VIDEO," filed on Nov. 4, 2016, the disclosures of which are hereby incorporated by reference in their entirety for all purposes.

TECHNICAL FIELD

The present disclosure relates to video capture and playback, and more particularly to 360 degree video recording and playback with object tracking.

BACKGROUND 360 degree video, also known as 360 degree videos, immersive videos, and/or spherical videos, are video recordings of a real-world panorama, where the view in every direction is recorded at the same time, shot using an omni-directional camera or a collection of cameras. During playback, the viewer has control of field of view (FOV) angles and viewing directions (a form of virtual reality).

BRIEF DESCRIPTION OF THE DRAWINGS

Certain features of the subject technology are set forth in the appended claims. However, for purpose of explanation, one or more implementations of the subject technology are set forth in the following figures.

The accompanying appendix, which is included to provide further understanding of the subject technology and are incorporated in and constitute a part of this specification, illustrate aspects of the subject technology and together with the description serve to explain the principles of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

In a system for 360 degree video capture and playback, 360 degree video may be captured, stitched, encoded, decoded, rendered, and played-back. In one or more implementations, a decoding device receives a 360 degree video stream as input and decodes the 360 degree video stream, and a memory device stores the 360 degree video stream and viewing history data associated with the 360 degree video stream. A rendering device may render the decoded stream using view angles from the viewing history data. In one or more implementations, an object tracking device tracks one or more objects in the decoded 360 degree video stream and provides one or more tracking angles associated with the objects. The rendering device may render the decoded 360 degree video stream using the one or more tracking angles to keep at least one object in the 360 degree video stream for one or more rendered frames.

Figure 1:
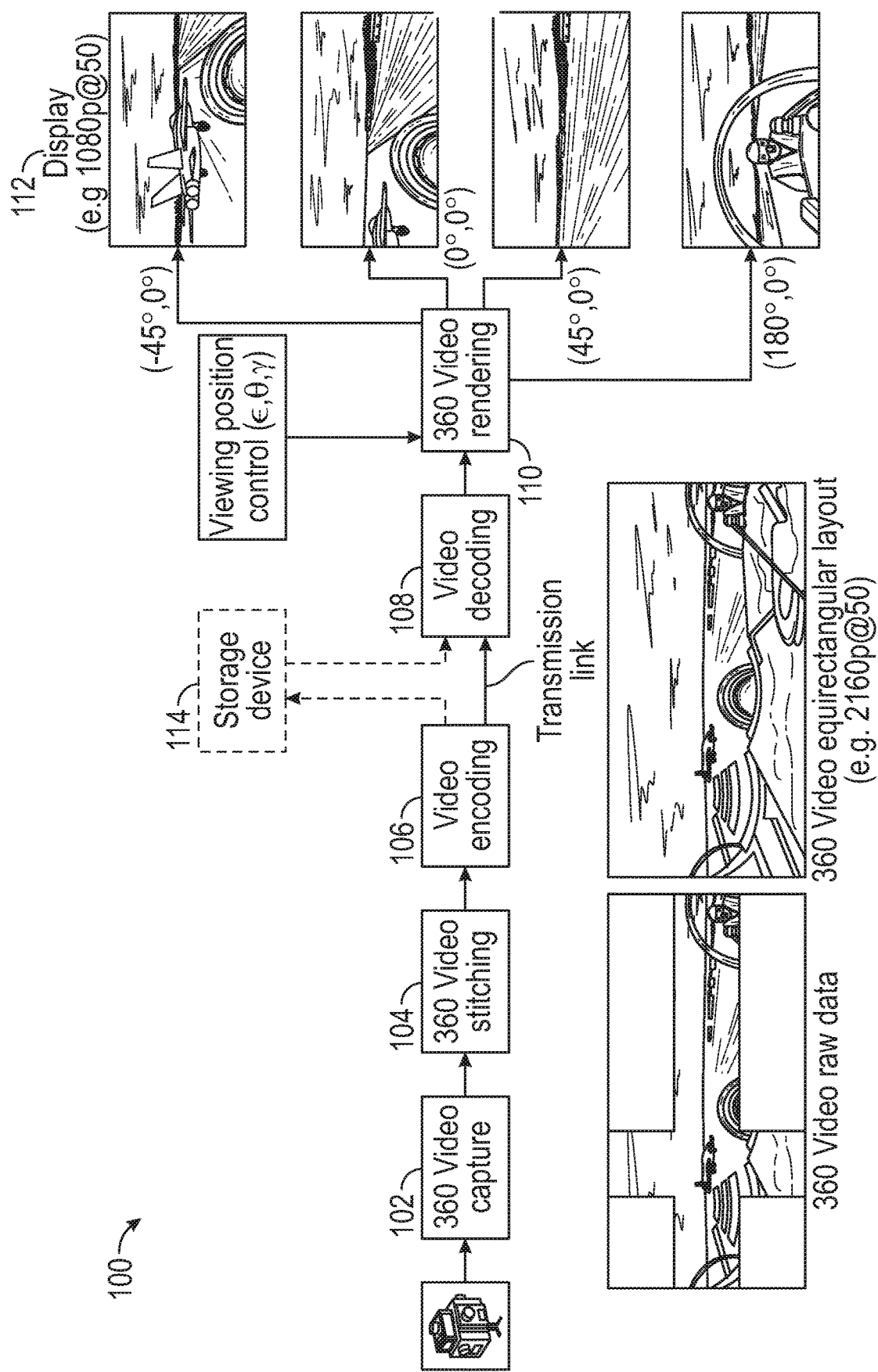
FIG. 1 illustrates an example network environment in which 360 degree video capture and playback may be implemented in accordance with one or more implementations.

FIG. 1 illustrates an example network environment 100 in which 360 degree video capture and playback can be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes a 360 degree video capture device 102, a 360 degree video stitching device 104, a video encoding device 106, a transmission link or storage media, a video decoding device 108, and a 360 degree video rendering device 110. In one or more implementations, one or more of the devices 102, 104, 106, 108, 110 may be combined into the same physical device. For example, the 360 degree video capture device 102, the 360 degree video stitching device 104, and the video encoding device 106 may be combined into a single device, and the video decoding device 108 and the 360 degree video rendering device 110 may be combined into a single device. In some aspects, the network environment 100 may include a storage device 114 that stores the encoded 360 degree video (such as on DVDs, Bluray, Digital Video Recording (DVR) at the cloud or gateway/set-top box, etc.) and then played back on a display device (e.g., 112).

The network environment 100 may further include a 360 degree video projection format conversion device (not shown) that may perform 360 degree video projection format conversion before the video encoding by the video encoding device 106 and/or after the video decoding by the video decoding device 108. The network environment 100 may also include a 360 degree video projection format conversion device (not shown) that is inserted between video decoding device 108 and 360 video rendering device 110. In one or more implementations, the video encoding device 106 may be communicatively coupled to the video decoding device 108 via a transmission link, such as over a network.

In the subject system, the 360 degree video stitching device 104 may utilize an additional coordinate system that provides more freedom on the 360 degree video capture side when projecting captured 360 degree video to a 2D input picture coordinate system for storage or transmission. The 360 degree video stitching device 104 may also support multiple projection formats for 360 degree video storage, compression, transmission, decoding, rendering, etc. For example, the video stitching device 104 may remove overlapped areas captured by a camera rig, and output e.g. six view sequences that each covers a 90°×90° viewport. The 360 degree video projection format conversion device (not shown) may convert an input 360 degree video projection format (e.g. cube projection format) to an output 360 degree video projection format (e.g. the equirectangular format).

The video encoding device 106 may minimize spatial discontinuities (i.e. the number of face boundaries) in the composed picture, for better spatial prediction thus better compression efficiency in the video compression. For the cube projection for example, a preferable layout should have the minimized number of face boundaries, e.g. 4, within a composed 360 degree video picture. The video encoding device 106 may implement unrestricted motion compensation (UMC) for better compression efficiency.

In the subject system, the 360 degree video rendering device 110 may derive a chroma projection map from a luma prediction map. The 360 degree video rendering device 110 may also chose the rendering picture size to maximize the display video quality. The 360 degree video rendering device 110 may also jointly select the horizontal FOV angle $\alpha$ and the vertical FOV angle $\beta$ to minimize the rendering distortion. The 360 degree video rendering device 110 may also control the FOV angles to realize real-time 360 degree video rendering subject to available memory bandwidth budget.

In FIG. 1, the 360 degree video is captured by a camera rig, and stitched together into the equirectangular format. The video is then compressed into any suitable video compression format (e.g. MPEG/ITU-T AVC/H.264, HEVC/H.265, VP9 etc.) and transmitted via transmission link (e.g. cable, satellite, terrestrial, internet streaming, etc.). On the receiver side, the video is decoded (e.g., 108) and stored in the equirectangular format, then is rendered (e.g., 110) according to the viewing direction angles and field of view (FOV) angles, and displayed (e.g., 112). In the subject system, the end-users have control of FOV angles and viewing direction angles in order to view the video at desired viewing angles.

Coordinate Systems

Figure 2:
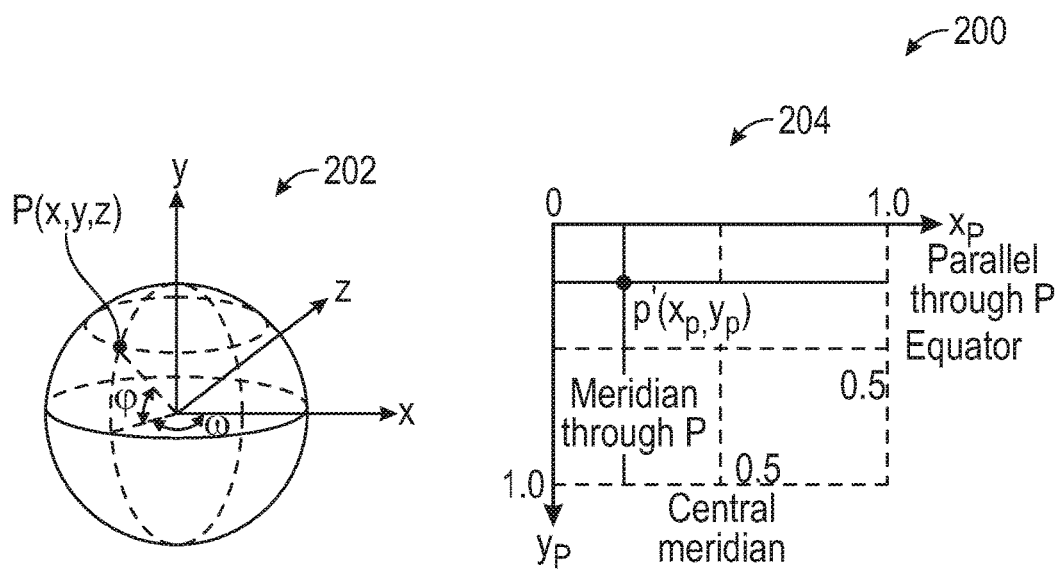
FIG. 2 conceptually illustrates an example of an equirectangular projection format.

There are multiple coordinate systems that apply to the subject technology, including, but not limited to:
- (x, y, z)—3D 360 degree video capture (camera) coordinate system
- (x', y', z')—3D 360 degree video viewing coordinate system
- $(x_p, y_p)$—2D normalized projection coordinate system, with $x_p \in [0.0:1.0]$ and $y_p \in [0.0:1.0]$.
- $(X_p, Y_p)$—2D input picture coordinate system, with $X_p \in [0:\text{inputPicWidth}-1]$ and $Y_p \in [0:\text{inputPicHeight}-1]$, where inputPicWidth×inputPicHeight is input picture size of a color component (e.g. Y, U or V).
- $(x_c, y_c)$—2D normalized rendering coordinate system, with $x_c \in [0.0:1.0]$ and $y_c \in [0.0:1.0]$.
- $(X_c, Y_c)$—2D output rendering picture coordinate system, with $X_c \in [0:\text{renderingPicWidth}-1]$ and $Y_c \in [0:\text{renderingPicHeight}-1]$, where picWidth×picHeight is the output rendering picture size of a color component (e.g. Y, U or V).
- $(x_r, y_r, z_r)$—3D 360 degree video projection coordinate system FIG. 2 conceptually illustrates an example of an equirectangular projection format 200. The equirectangular projection format 200 represents a standard way of texture mapping a sphere in computer graphics. It is also known as equidistant cylindrical projection, geographic projection, plate carré or carte parallelogrammatique. As shown in FIG. 2, to project a sphere surface point p(x,y,z) (e.g., 202) to a sample p'($x_p$, $y_p$) in the normalized projection coordinate system (e.g., 204), both longitude ω and latitude φ are computed for p(x, y, z) according to Equation 1.

$$\begin{cases} \omega = \arctan 2(x, z) \\ \varphi = \arcsin\left(\dfrac{y}{\sqrt{x^2 + y^2 + z^2}}\right) \end{cases}, \quad \text{Equation 1}$$

where $$\omega \in [-\pi:\pi] \text{ and}$$
$$\varphi \in \left[-\dfrac{\pi}{2}:\dfrac{\pi}{2}\right].$$

π is the ratio of a circle's circumference to its diameter, commonly approximated as 3.1415926.

The equirectangular projection format 200 may be defined as in Equation 2:

$$\begin{cases} x_p = \dfrac{\omega}{2\pi} + 0.5 \\ y_p = -\dfrac{\varphi}{\pi} + 0.5 \end{cases}, \quad \text{Equation 2}$$

where $x_p \in [0.0:1.0]$ and $y_p \in [0.0:1.0]$. $(x_p, y_p)$ is the coordinate in the normalized projection coordinate system.

Figure 3:
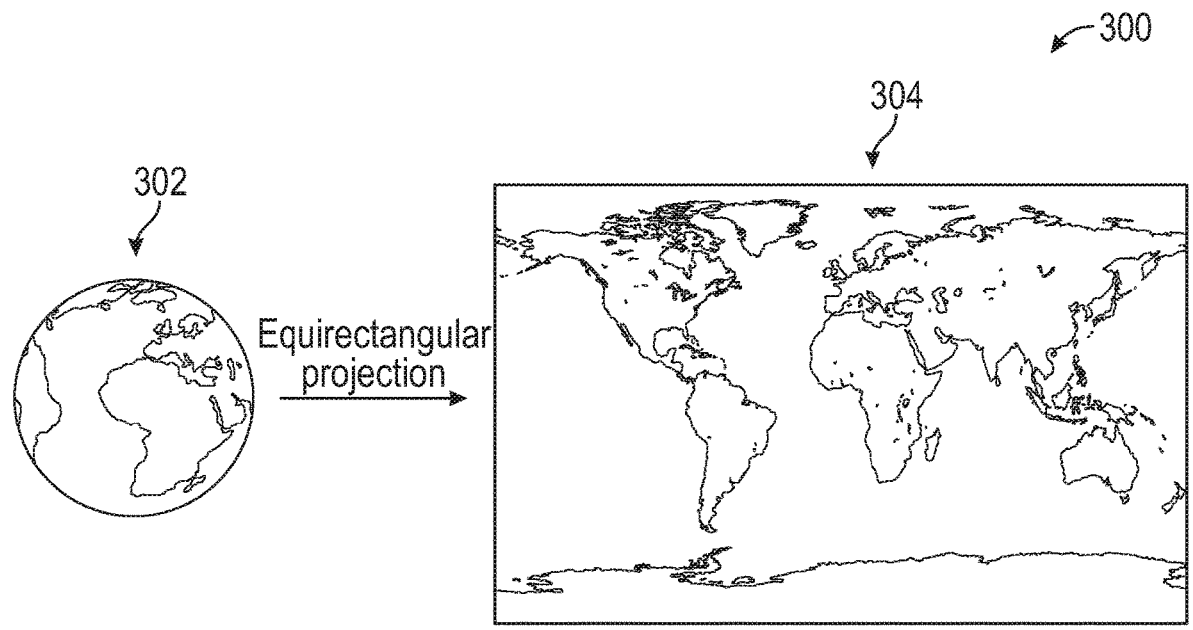
FIG. 3 conceptually illustrates an example of an equirectangular projection with Earth map.

FIG. 3 conceptually illustrates an example of an equirectangular projection layout 300 with Earth map. In the equirectangular projection layout 300, the picture has 1:1 mapping along the equator only, and is stretched elsewhere. The largest mapping distortion occurs at north and South Pole of a sphere (e.g., 302), where a single point is mapped to line of samples on the equirectangular projection picture (e.g., 304), resulting in lots of redundant data in the composed 360 degree video using the equirectangular projection layout 300.

Figure 4:
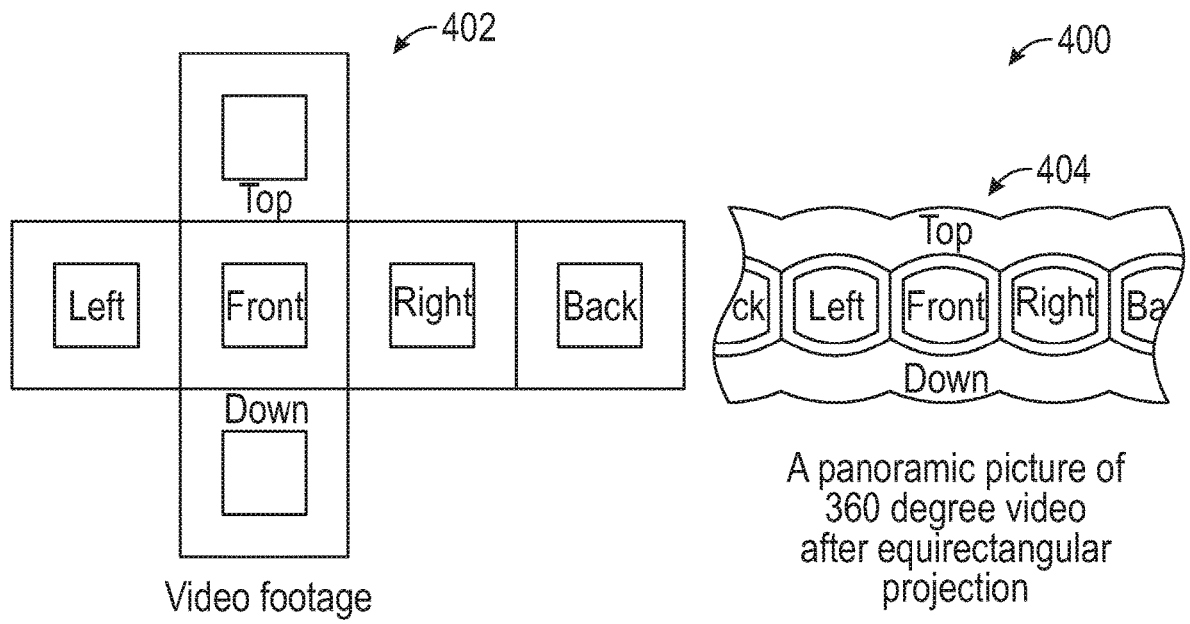
FIG. 4 conceptually illustrates an example of 360 degree video with equirectangular projection.
Figure 5:
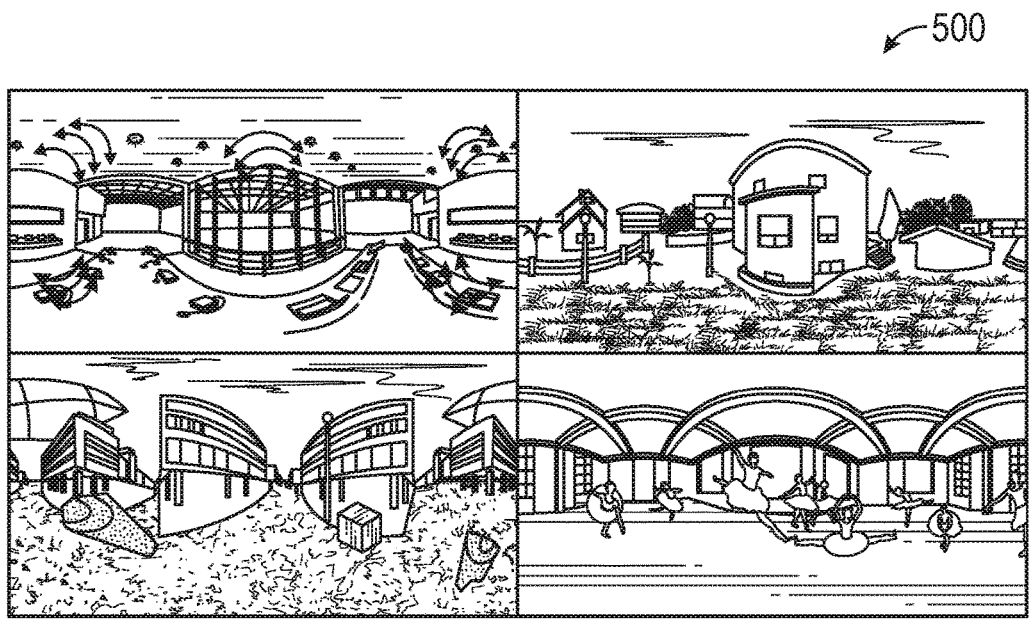
FIG. 5 conceptually illustrates examples of 360 degree images in equirectangular projection layout.

FIG. 4 conceptually illustrates an example of 360 degree video with equirectangular projection layout 400. To leverage the existing infrastructure for video delivery in which single layer video codec is employed, the 360 degree video footages (e.g., 402) captured by multiple cameras at different angles are normally stitched and composed into a single video sequence stored in the equirectangular projection layout. As shown in FIG. 4, in the equirectangular projection layout 400, the left, front and right video footage of the 360 degree video is projected in the middle of the picture, the back video footage is split evenly and placed in the left and right sides of the picture; the top and down video forage is placed on the top and bottom part of the picture, respectively (e.g., 404). All the video footage is stretched, with the top and down video footage being stretched the most. FIG. 5 conceptually illustrates examples of 360 degree video images in equirectangular projection layout.

Cube Projection

Figure 6:
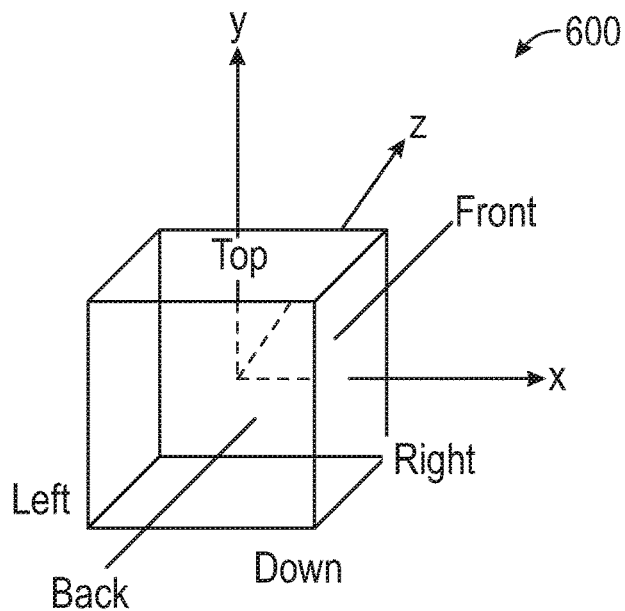
FIG. 6 conceptually illustrates an example definition of a six-faced cube.

FIG. 6 conceptually illustrates an example definition of a six-faced cube 600. Another common projection format to store the 360 degree view is to project video footage to cube faces. As shown in FIG. 6 the six faces of a cube are named as Front, Back, Left, Right, Top and Down.

Figure 7:
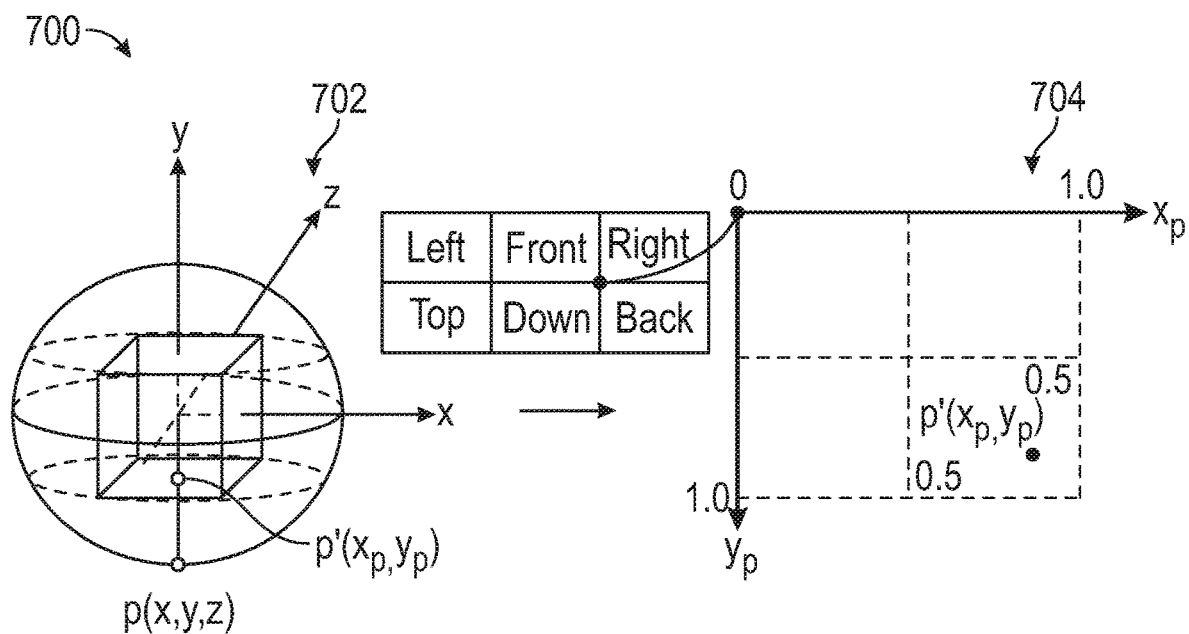
FIG. 7 conceptually illustrates an example of a cube projection format.

FIG. 7 conceptually illustrates an example of a cube projection format 700. In FIG. 7, the cube projection format 700 includes mapping a sphere surface point p(x, y, z) to one of six cube faces (e.g., 702), in which both the cube face id and coordinate $(x_p, y_p)$ in the normalized cube projection coordinate system are computed (e.g., 704).

Figure 8:
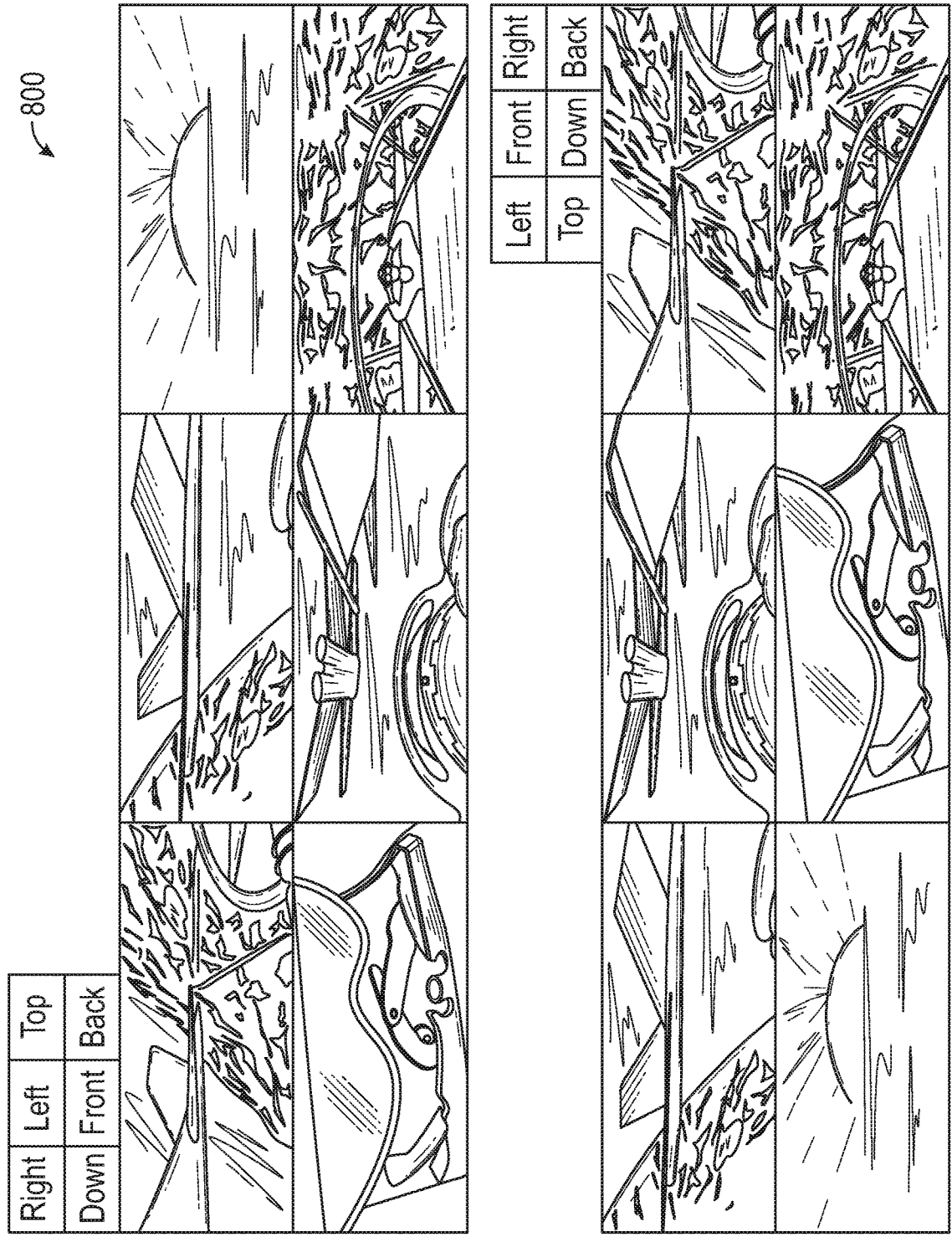
FIG. 8 conceptually illustrates examples of 360 degree images in cube projection layout.

FIG. 8 conceptually illustrates examples of 360 degree video images in the cube projection layout 800. The projection rule of the cube projection is described in Table 1, where pseudo code for mapping a sphere surface point p(x, y, z) to a cube face is provided.

TABLE 1

| Pseudo-code for Cube Projection Mapping |
| --- |
| if (z > 0&&(-z ≤ y ≤ z)&&(-z ≤ x ≤ z)) |
| $\left\{\text{faceID} = \text{Front}; x_p = \dfrac{z+x}{2z}; y_p = \dfrac{z-y}{2z}\right\}$ |
| else if (z < 0&&(z ≤ y ≤ -z)&&(z ≤ x ≤ -z)) |
| $\left\{\text{faceID} = \text{Back}; x_p = \dfrac{z+x}{2z}; y_p = \dfrac{z+y}{2z}\right\}$ |
| else if (x > 0&&(-x ≤ y ≤ x)&&(-x ≤ z ≤ x)) |
| $\left\{\text{faceID} = \text{Right}; x_p = \dfrac{x-z}{2x}; y_p = \dfrac{x-y}{2x}\right\}$ |
| else if (x < 0&&(x ≤ y ≤ -x)&&(x ≤ z ≤ -x)) |
| $\left\{\text{faceID} = \text{Left}; x_p = \dfrac{x-z}{2x}; y_p = \dfrac{x+y}{2x}\right\}$ |
| else if (y > 0&&(-y ≤ x ≤ y)&&(-y ≤ z ≤ y)) |
| $\left\{\text{faceID} = \text{Top}; x_p = \dfrac{y+x}{2y}; y_p = \dfrac{y+z}{2y}\right\}$ |
| else if (y < 0&&(y ≤ x ≤ -y)&&(y ≤ z ≤ -y)) |
| $\left\{\text{faceID} = \text{Down}; x_p = \dfrac{y-x}{2y}; y_p = \dfrac{y+z}{2y}\right\}$ |

Field of View (FOV) and Viewing Direction Angles

For display of 360 degree video, a portion of each 360 degree video picture needs to be projected and rendered. The field of view (FOV) angles define how big portion of a 360 degree video picture is displayed, while the viewing direction angles defines which portion of the 360 degree video picture is shown.

For displaying a 360 degree video, just imagine that the video is mapped on a unity sphere surface, a viewer sitting at the center point of the sphere is able to view a rectangular screen, and the screen has its four corners located on the sphere surface. Here (x', y', z') is called the 360 view viewing coordinate system and $(x_c, y_c)$ is referred as the normalized rendering coordinate system.

Figure 9:
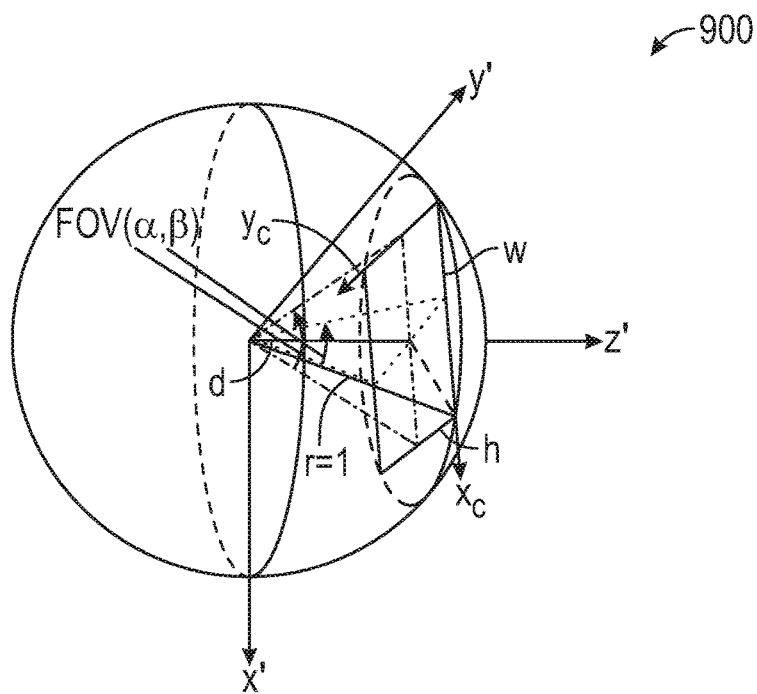
FIG. 9 conceptually illustrates an example of a normalized projection plane size determined by field-of-view angles.

FIG. 9 conceptually illustrates an example of a normalized projection plane size 900 determined by field-of-view angles. As shown in FIG. 9, in the viewing coordinate system (x',y',z'), the center point of the projection plane (i.e. the rectangular screen) is located on z' axis and is parallel to x'y' plane. Therefore, the projection plane size w×h and its distance to the center of the sphere d can be computed by:

$$\begin{cases} w = \dfrac{2ta}{\sqrt{ta^2 + tb^2 + 1}} \\ h = \dfrac{2tb}{\sqrt{ta^2 + tb^2 + 1}} \\ d = \dfrac{1}{\sqrt{ta^2 + tb^2 + 1}} \end{cases}, \quad \text{Equation 3}$$

where $$ta = \tan\left(\frac{\alpha}{2}\right) \text{ and}$$

$$tb = \tan\left(\frac{\beta}{2}\right) \text{ and}$$

$$\alpha \in (0:\pi]$$

is the horizontal FOV angle and $\beta \in (0:\pi]$ is the vertical FOV angle.

Figure 10:
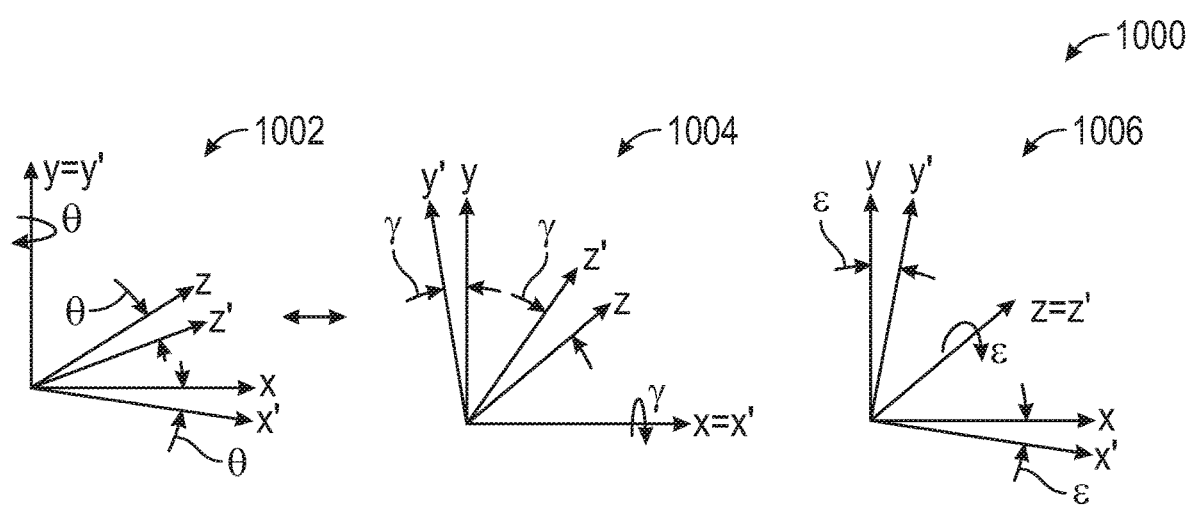
FIG. 10 conceptually illustrates an example of viewing direction angles.

FIG. 10 conceptually illustrates an example of viewing direction angles 1000. The viewing direction is defined by rotation angles of the 3D viewing coordinate system (x', y', z') relative to the 3D capture coordinate system (x,y,z). As shown in FIG. 10, the viewing direction is dictated by the clockwise rotation angle θ along y axis (e.g., 1002, yaw), the counterclockwise rotation angle γ along x axis (e.g., 1004, pitch), and the counterclockwise rotation angle ε along z axis (e.g., 1006, roll).

The coordinate mapping between the (x,y,z) and (x',y',z') coordinate system is defined as:

$$\begin{bmatrix} x \\ y \\ z \end{bmatrix} = \begin{bmatrix} \cos\epsilon & \sin\epsilon & 0 \\ -\sin\epsilon & \cos\epsilon & 0 \\ 0 & 0 & 1 \end{bmatrix} \begin{bmatrix} \cos\theta & 0 & \sin\theta \\ 0 & 1 & 0 \\ -\sin\theta & 0 & \cos\theta \end{bmatrix} \begin{bmatrix} 1 & 0 & 0 \\ 0 & \cos\gamma & \sin\gamma \\ 0 & -\sin\gamma & \cos\gamma \end{bmatrix} \begin{bmatrix} x' \\ y' \\ z' \end{bmatrix}$$

That is, $$\begin{bmatrix} x \\ y \\ z \end{bmatrix} = \quad\quad\quad\quad\quad\quad\quad\quad\quad\quad\quad\quad \text{Equation 4}$$

$$\begin{bmatrix} \cos\epsilon\cos\theta & -\cos\epsilon\sin\theta\sin\gamma + \sin\epsilon\cos\gamma & \cos\epsilon\sin\theta\cos\gamma + \sin\epsilon\sin\gamma \\ -\sin\epsilon\cos\theta & \sin\epsilon\sin\theta\sin\gamma + \cos\epsilon\cos\gamma & -\sin\epsilon\sin\theta\cos\gamma + \cos\epsilon\sin\gamma \\ -\sin\theta & -\cos\theta\sin\gamma & \cos\theta\cos\gamma \end{bmatrix} \begin{bmatrix} x' \\ y' \\ z' \end{bmatrix}$$

Figure 11:
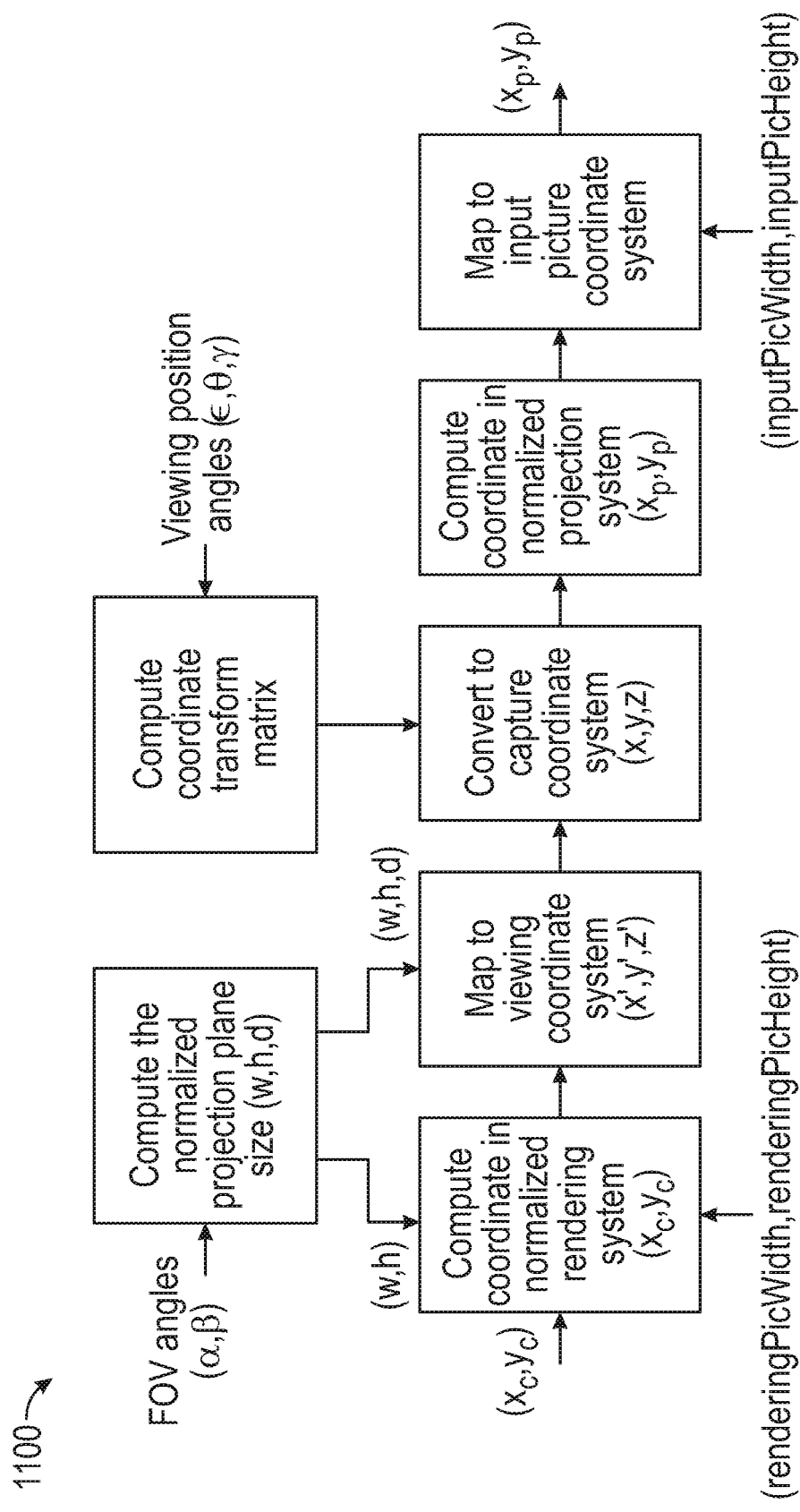
FIG. 11 illustrates a schematic diagram of a coordinate mapping between an output rendering picture and an input 360 degree video picture.

FIG. 11 illustrates a schematic diagram of a coordinate mapping 1100 between an output rendering picture and an input picture. With the FOV and viewing direction angles defined above, the coordinate mapping between the output rendering picture coordinate system ($X_c$, $Y_c$) (i.e. the rendering picture for display) and the input picture coordinate system ($X_p$, $Y_p$) (i.e. the input 360 degree video picture) can be established. As shown in FIG. 11, given a sample point ($X_c$, $Y_c$) in the rendering picture, the coordinate of the corresponding sample point ($X_p$, $Y_p$) in the input picture can be derived by the following steps:

Compute the normalized projection plane size and distance to sphere center based on the FOV angles (α, β) (i.e. Equation 3); compute the coordinate transform matrix between the viewing and capture coordinate system based on the viewing direction angles (ε, θ, γ) (i.e. Equation 4)

Normalize ($X_c$, $Y_c$) based on the rendering picture size and the normalized projection plane size.

Map the coordinate ($x_c$, $y_c$) in the normalized rendering coordinate system to the 3D viewing coordinate system (x', y', z').

Convert the coordinate to the 3D capture coordinate system (x, y, z)

Derive the coordinate ($x_p$, $y_p$) in the normalized projection coordinate system Convert the derived coordinate to integer position in the input picture based on input picture size and projection layout format.

Figure 12:
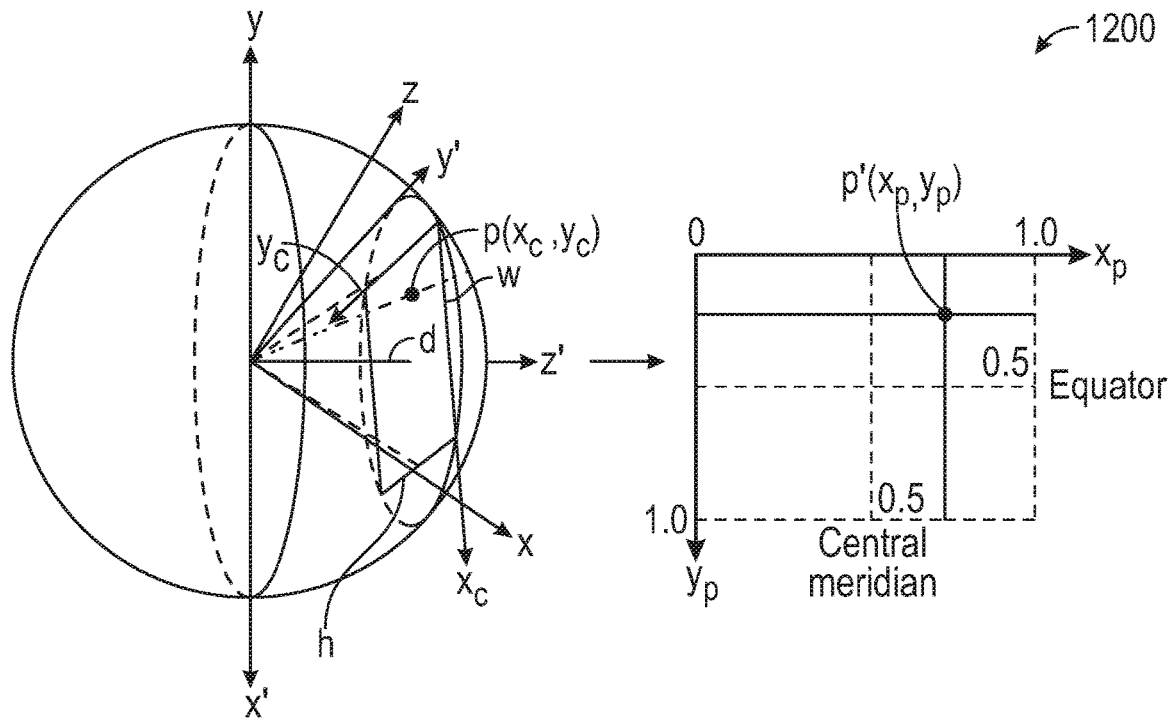
FIG. 12 conceptually illustrates an example of mapping a point in the normalized rendering coordinate system to the normalized projection coordinate system using the equirectangular projection format.

FIG. 12 conceptually illustrates an example of mapping a point in the normalized rendering coordinate system (e.g., p($x_c$, $y_c$)) to the normalized projection coordinate system (e.g., p'($x_p$, $y_p$)) using the equirectangular projection format 1200.

In one or more implementations, projection from the equirectangular input format is performed. For example, if the input picture is in the equirectangular projection format, the following steps may apply to map a sample point ($X_c$, $Y_c$) in the rendering picture to a sample point ($X_p$, $Y_p$) in the input picture.

Compute normalized display projection plane size based on the FOV angles:

$$\begin{cases} w = \dfrac{2ta}{\sqrt{ta^2 + tb^2 + 1}} \\ h = \dfrac{2tb}{\sqrt{ta^2 + tb^2 + 1}} \\ d = \dfrac{1}{\sqrt{ta^2 + tb^2 + 1}} \end{cases},$$

where $$ta = \tan\left(\frac{\alpha}{2}\right) \text{ and}$$

$$tb = \tan\left(\frac{\beta}{2}\right)$$

Map ($X_c$, $Y_c$) into the normalized rendering coordinate system:

$$\begin{cases} x_c = \dfrac{X_c w}{renderingPicWidth} \\ y_c = \dfrac{Y_c h}{renderingPicHeight} \end{cases}$$

Compute the coordinate of p($x_c$,$y_c$) in (x', y', z') viewing coordinate system:

$$\begin{cases} x' = x_c - \dfrac{w}{2} \\ y' = -y_c + \dfrac{h}{2} \\ z' = d \end{cases}$$

Convert coordinate (x',y',z') into (x, y, z) capture coordinate system based on the viewing direction angles:

$$\begin{bmatrix} x \\ y \\ z \end{bmatrix} =$$

-continued $$\begin{bmatrix} \cos\epsilon\cos\theta & -\cos\epsilon\sin\theta\sin\gamma + \sin\epsilon\cos\gamma & \cos\epsilon\sin\theta\cos\gamma + \sin\epsilon\sin\gamma \\ -\sin\epsilon\cos\theta & \sin\epsilon\sin\theta\sin\gamma + \cos\epsilon\cos\gamma & -\sin\epsilon\sin\theta\cos\gamma + \cos\epsilon\sin\gamma \\ -\sin\theta & -\cos\theta\sin\gamma & \cos\theta\cos\gamma \end{bmatrix} \begin{bmatrix} x' \\ y' \\ z' \end{bmatrix}$$

Project p(x,y,z) onto the normalized projection coordinate system p'($x_p$, $y_p$):

$$\begin{cases} x_p = \dfrac{\arctan2(x, z)}{2\pi} + 0.5 \\ y_p = -\dfrac{\arcsin\left(\dfrac{y}{\sqrt{x^2 + y^2 + z^2}}\right)}{\pi} + 0.5 \end{cases} \quad \text{Equation 5}$$

Map p'($x_p$, $y_p$) onto the input picture (equirectangular) coordinate system ($X_p$, $Y_p$)

$$\begin{cases} X_p = (int)(x_p * inputPicWidth) \\ Y_p = (int)(y_p * inputPicHeight) \end{cases},$$

where:
  α, β are FOV angles and ε, θ, γ are viewing direction angles.
  renderingPicWidth×renderingPicHeight is the renedering picture size
  inputPicWidth×inputPicHeight is the input picture size (in equirectangular projection format)

Figure 13:
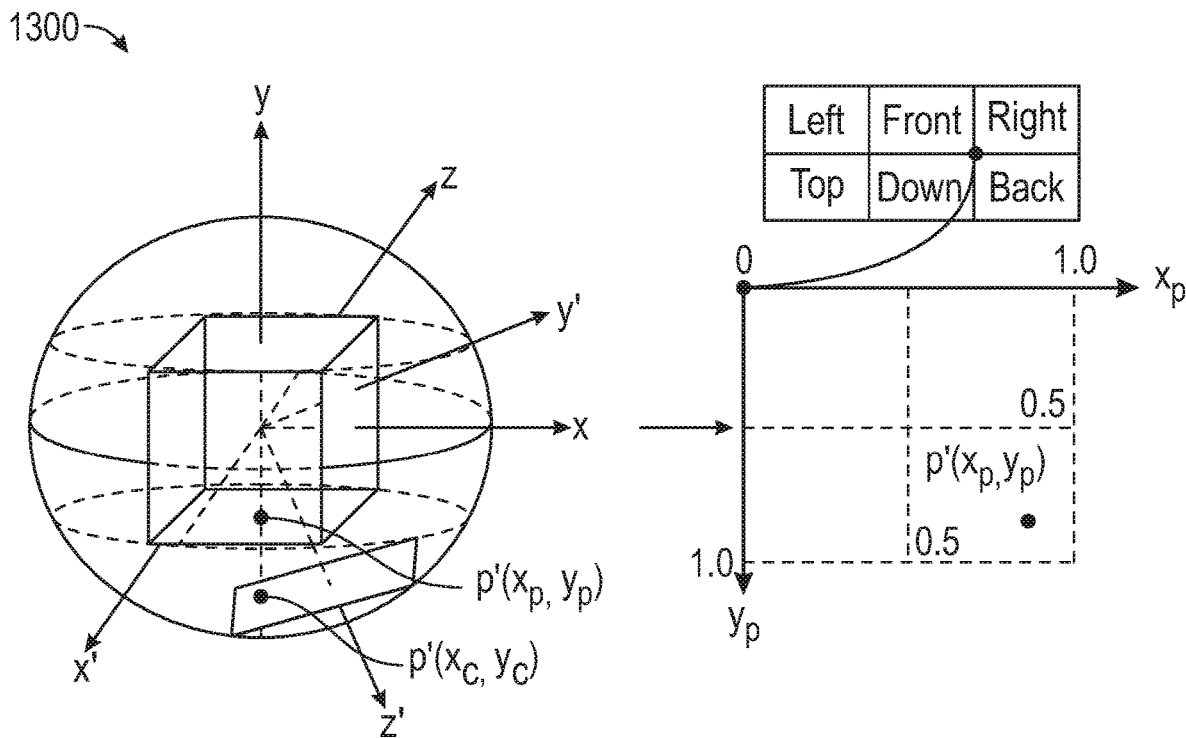
FIG. 13 conceptually illustrates an example of mapping a point in the normalized rendering coordinate system to the normalized projection coordinate system using the cube projection format.

FIG. 13 conceptually illustrates an example of mapping a point in the normalized rendering coordinate system (e.g., p($x_c$,$y_c$)) to the normalized projection coordinate system (e.g., p'($x_p$, $y_p$)) using the cube projection format 1300.

In one or more implementations, projection from the cube projection input format is performed. For example, if the input picture is in cube projection format, the following similar steps apply to map a sample point ($X_c$, $Y_c$) in the rendering picture to a sample point ($X_p$, $Y_p$) in the input picture.

Compute normalized display projection plane size based on the FOV angles:

$$\begin{cases} w = \dfrac{2ta}{\sqrt{ta^2 + tb^2 + 1}} \\ h = \dfrac{2tb}{\sqrt{ta^2 + tb^2 + 1}} \quad \text{where } ta = \tan\left(\dfrac{\alpha}{2}\right) \text{ and } tb = \tan\left(\dfrac{\beta}{2}\right) \\ d = \dfrac{1}{\sqrt{ta^2 + tb^2 + 1}} \end{cases}$$

Map ($X_c$, $Y_c$) into the normalized rendering coordinate system:

$$\begin{cases} x_c = \dfrac{X_c w}{renderingPicWidth} \\ y_c = \dfrac{Y_c h}{rendetringPicHeight} \end{cases}$$

Compute the coordinate of p($x_c$,$y_c$) in (x', y', z') viewing coordinate system:

$$\begin{cases} x' = x_c - \dfrac{w}{2} \\ y' = -y_c + \dfrac{h}{2} \\ z' = d \end{cases}$$

Convert coordinate (x',y',z') into (x, y, z) capture coordinate system based on the viewing direction angles:

$$\begin{bmatrix} x \\ y \\ z \end{bmatrix} =$$

$$\begin{bmatrix} \cos\epsilon\cos\theta & -\cos\epsilon\sin\theta\sin\gamma + \sin\epsilon\cos\gamma & \cos\epsilon\sin\theta\cos\gamma + \sin\epsilon\sin\gamma \\ -\sin\epsilon\cos\theta & \sin\epsilon\sin\theta\sin\gamma + \cos\epsilon\cos\gamma & -\sin\epsilon\sin\theta\cos\gamma + \cos\epsilon\sin\gamma \\ -\sin\theta & -\cos\theta\sin\gamma & \cos\theta\cos\gamma \end{bmatrix} \begin{bmatrix} x' \\ y' \\ z' \end{bmatrix}$$

Project p(x,y,z) onto the normalized cube coordinate system p'($x_p$, $y_p$) based on the Pseudo code defined in Table 1.

Map p'($x_p$, $y_p$) onto the input cube coordinate system ($X_p$, $Y_p$) (assuming all the cube faces have a same resolution)

$$\begin{cases} X_p = (int)\left(x_p * \dfrac{inputPicWidth}{3}\right) + Xoffset[faceID] \\ Y_p = (int)\left(y_p * \dfrac{inputPicHeight}{2}\right) + Yoffset[faceID] \end{cases}$$

where:
  α, β are FOV angles and ε, θ, γ are viewing direction angles.
  renderingPicWidth×renderingPicHeight is the renedering picture size
  inputPicWidth×inputPicHeight is the input picture size (in cube projection format)
  {(Xoffset[faceID],Yoffset[facID])|faceID=Front, back, Left, Right, Top and Down} is the coordinate offsets of a cube face in the input cube projection coordinate system.

$$\begin{cases} Xoffset[6] = \left\{0, \dfrac{inputPicWidth}{3}, \dfrac{2inputPicWidth}{3}, 0, \dfrac{inputPicWidth}{3}, \dfrac{2inputPicWidth}{3}\right\} \\ Yoffset[6] = \left\{0, 0, 0, \dfrac{inputPicHeight}{2}, \dfrac{inputPicHeight}{2}, \dfrac{inputPicHeight}{2}\right\} \end{cases}$$

For the cube projection layout depicted in FIG. 13, the face ID is in the order of Front, back, Left, Right, Top followed by Down to access the coordinate offsets array.

Sample Rendering for Display

In the projection of 360 degree video for display, multiple samples in a input 360 degree video picture (e.g. in equirectangular format or cube projection format) may project to a same integer location ($X_c$, $Y_c$) in the rendering picture. To have a smooth rendering, not only the integer-pel positions, but also its sub-pel positions in the rendering picture are projected to find counterpart samples in the input picture.

Figure 14:
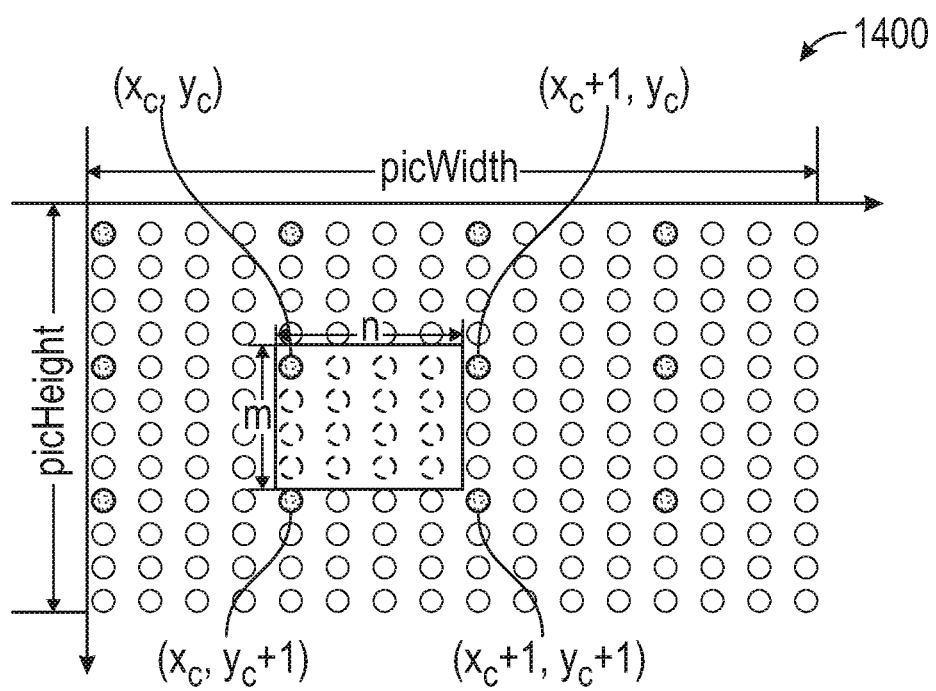
FIG. 14 conceptually illustrates an example of a two-dimensional layout 1400 of samples of an input 360 degree video picture being projected for 360 degree video rendering.

FIG. 14 conceptually illustrates an example of a two-dimensional layout 1400 of samples of an input 360 video picture being projected for 360 degree video rendering. As shown in FIG. 14, if the projection precision is $$\frac{1}{n}$$

sub-pel in horizontal direction and $$\frac{1}{m}$$

sun-pel in vertical direction, then the sample value of the rendering picture at location ($X_c$, $Y_c$) can be rendered by:

$$renderingImg[X_c, Y_c] = \frac{\sum_{i=0}^{m-1}\sum_{j=0}^{n-1} inputImg\left[mapping\_func\left(X_c + \frac{j+0.5}{n}, Y_c + \frac{i+0.5}{m}\right)\right] + \frac{mn}{2}}{mn},$$

Equation 6

Where:
($X_p$, $Y_p$)=mapping_func($X_c$,$Y_c$) is the coordinate mapping function from the rendering picture to input 360 video picture defined in sections above (e.g. w/equirectangular projection or cube projection format).

inputImg[$X_p$, $Y_p$] is the sample value at location ($X_p$, $Y_p$) in the input picture.

renderingImg[$X_c$, $Y_c$] is the sample value at location ($X_c$, $Y_c$) in the output rendering picture.

Instead of computing the coordinate mapping between the output rendering coordinate system ($X_c$, $Y_c$) and the input picture coordinate system ($X_c$, $Y_p$) on-the-fly, the coordinate mapping can also be pre-computed and stored as the projection map for the entire rendering picture. Since the viewing direction and FOV angles may not change from picture to picture, the pre-computed projection map can be shared by the rendering of multiple pictures.

Let projectMap[n*$X_c$+j, m*$Y_c$+i] be the pre-computed projection map, with $X_c$=0, 1, . . . , renderingPicWidth−1, $Y_c$=0, 1, . . . , renderingPicHeight−1, j=0, 1, . . . , n−1 and i=0, 1, . . . , m−1. Each entry of the projection map stores the pre-computed coordinate value ($X_c$, $Y_p$) of the input picture coordinate system for a sub-pel location $$\left(X_c + \frac{j+0.5}{n}, Y_c + \frac{i+0.5}{m}\right)$$

in the rendering picture. The rendering can be written as:

$$renderingImg[X_c, Y_c] = \frac{\sum_{i=0}^{m-1}\sum_{j=0}^{n-1} inputImg[projectMap[n*X_c + j, m*Y_c + i]] + \frac{mn}{2}}{mn}$$

Equation 7

A picture may have multiple color components, such as YUV, YCbCr, RGB. The above rendering process can apply to color components, independently.

Recording and Playback

A number of services such as YouTube, Facebook, etc. . . . have begun to provide 360° video sequences recently. These services allow the user to look around the scene in all directions while the video is playing. The user can rotate the scene to view anything they find interesting at a given time.

There are a number of formats used for 360 degree video, but each involves some projection of a 3D surface (sphere, cube, octahedron, icosahedron, etc. . . . ) onto a 2D plane. The 2D projection is then encoded/decode like any normal video sequence. At the decoder, a portion of that 360° view is rendered and displayed, depending on the user's angle of view at that time.

The end result is that the user is given the freedom to look everywhere around them which greatly increases the immersive feeling, making it feel as if they were in the scene. Combined with spatial audio effects (rotating the audio surround sound to match the video), the effect can be quite engaging.

Figure 15:
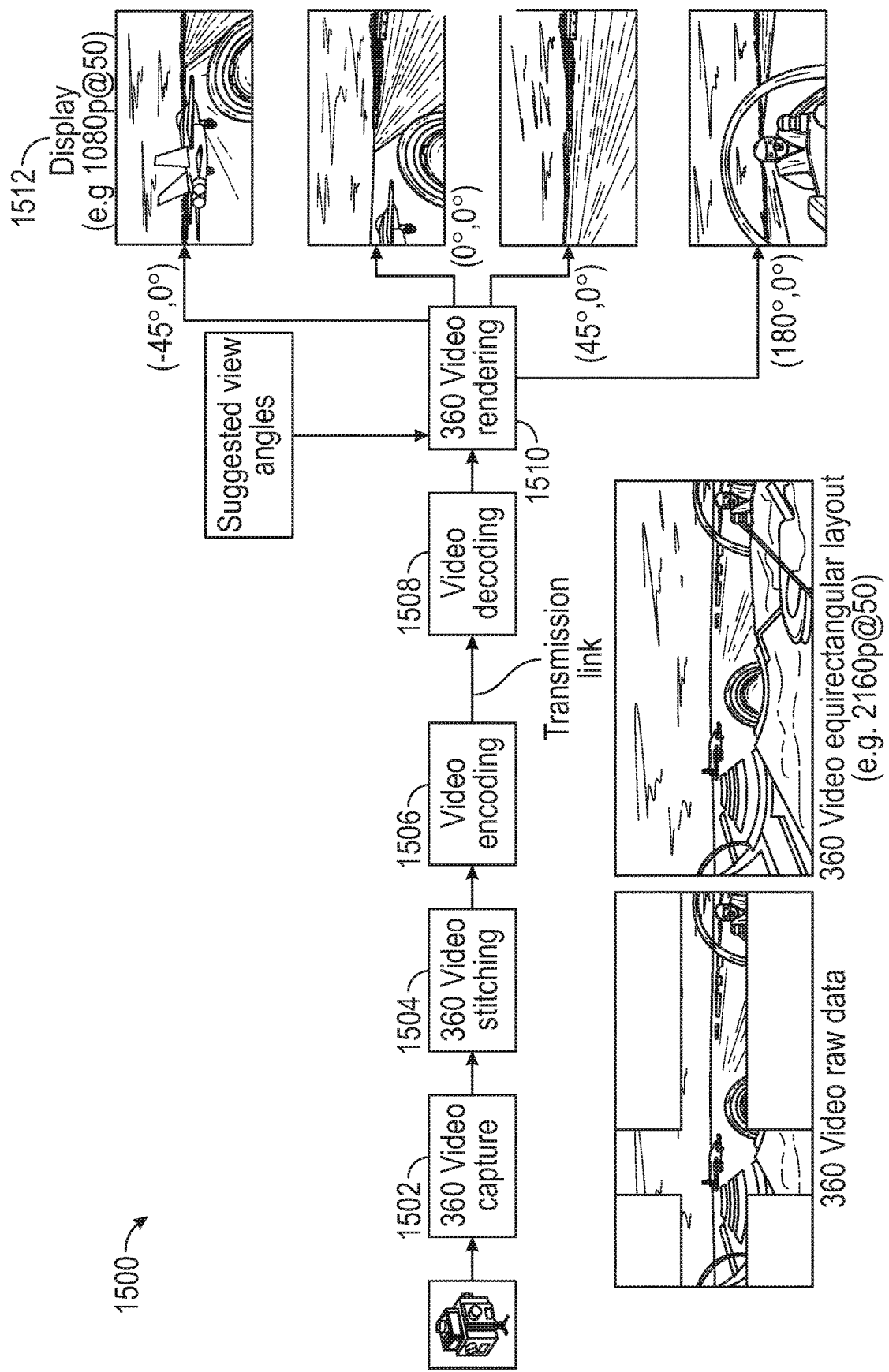
FIG. 15 illustrates an example network environment in which recording and playback of 360 degree video can be implemented in accordance with one or more implementations.

FIG. 15 illustrates an example network environment 1500 in which recording and playback of 360 degree video can be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The example network environment 1500 includes a 360 video capture device 1502, a 360 video stitching device 1504, a video encoding device 1506, a video decoding device 1508, and a 360 video rendering device 1510. In one or more implementations, one or more of the devices 1502, 1504, 1506, 1508, 1510 may be combined into the same physical device. For example, the 360 video capture device 1502, the 360 video stitching device 1504, and the video encoding device 1506 may be combined into a single device, and the video decoding device 1508 and the 360 video rendering device 1510 may be combined into a single device. The video decoding device 1508 may include an audio decoding device (not shown) in some embodiments, or the video decoding device 1508 may be communicably coupled to a separate audio decoding device in other embodiments, for processing an incoming or stored 360 video compressed bitstream.

On the 360 video playback side, the network environment 1500 may further include a demultiplexer device (not shown) that may demultiplex the incoming compressed 360 degree video bitstream, and provide the demultiplexed bitstream respectively to the video decoding device 1508, the audio decoding device and a view angle extraction device (not shown). In some aspects, the demultiplexer device may be configured to de-compress the 360 video bitstream. The network environment 1500 may further include a 360 video layout format conversion device (not shown) that may perform 360 video layout format conversion before the video encoding by the video encoding device 1506 and/or after the video decoding by the video decoding device 1508. The network environment 1500 may also include a 360 video playback device (not shown) that plays back the rendered 360 video content. In one or more implementations, the video encoding device 1506 may be communicatively coupled to the video decoding device 1508 via a transmission link, such as over a network.

The 360 video playback device may store the 360 video rendering settings (e.g. FOV angles, viewing direction angles, rendering picture size, etc.) right before the playback is terminated or switched to another program channel, so that the stored rendering settings can be used when the playback of the same channel is resumed. The 360 video playback device may provide a preview mode in which the view angles may change automatically every N frames to help viewers to select the desirable viewing direction. The 360 video capture and playback device may compute the projection map on-the-fly (e.g. block by block) for saving memory bandwidth. In this instance, the projection map may not be loaded from the off-chip memory. In the subject system, different view fidelity information may be assigned to different views.

In the subject system, content providers may provide a "suggested view" for a given 360 degree video. This suggested view can be a specific set of view angles for each frame of the 360 degree video to provide the user with a recommended experience. In the event that the user is not particularly interested in controlling the view themselves at any given point in time, the user can watch (or play back) the suggested view and experience the view recommended by the content provider.

In the subject system, in order to efficiently store data needed to record/playback the decompressed 360 video bitstream in a specific view as it was originally watched by a user during a specific viewing or viewings, the view angle data such as FOV angles, and viewing direction angles "yaw", "pitch", and "roll" can be saved in the storage device for each frame. Combined with the original full 360 degree view data already recorded, a previously saved view can be recreated.

The view angle data may be stored in any number of ways. For example, the view angle data may be stored as 1) a separate file to be saved with the video sequence, 1) it may be inserted into the video stream as picture user data (e.g., AVC/HEVC supplemental enhancement info message—SEI messages), and/or 3) it may be carried as a separate stream of data within the video sequence (e.g., different MPEG-2 TS PID, or MP4 data stream). Storing the FOV angles and three (i.e., yaw, pitch, roll) viewing direction angles per frame is a relatively small cost in storage and processing overhead to enable the feature of record/playback of the 360 degree video content in any previously saved view.

In the subject system, the recorded view angle data may be provided to the video rendering device 1510 for recording a 360 degree video stream plus a specific set of view angles. The view angle data may be provided from the storage device, as recorded view angles, to the video rendering device 1510 for reconstructing a 360 degree video stream in the specified recorded view angles.

Depending on how the view angles are stored, a corresponding view angle extraction process may be initiated. In one or more implementations where the recorded view angles are stored within the compressed 360 video bitstream, the view angle extraction process may be used. For example, the video decoding device 1508 and/or the audio decoding device may extract view angles from the compressed 360 video bitstream (e.g., from the SEI messages within an HEVC bitstream). In this respect, the view angles extracted by the video decoding device 1508 may then be provided to the video rendering device 1510. If the view angles are stored in a separate stream of data (e.g., MPEG-2 TS PID), the demultiplexer device may extract this information and send it to the video rendering device 1510 as suggested view angles. In some examples, the demultiplexer feeds to a separate view angle extraction device (not shown) for extraction of the recorded view angles. In this respect, the subject system would have the ability to switch between the previously recorded view and the manually selected user view at any time.

In one or more implementations, the video rendering device 1510 may receive a set of user-selected view angles as input. The video rendering device 1510 may select between the set of user-selected view angles and predetermined view angles from viewing history data. The video rendering device 1510 may render one or more video sequences of the decoded 360 degree video stream with one or more view angles from the set of user-selected view angles when the set of user-selected view angles is selected over the predetermined view angles. In some aspects, the one or more video sequences are rendered back with one or more recorded view angles from the predetermined view angles after a predetermined period of time of user inactivity.

Switching between a previously recorded view and the manual view may include prompting the user to provide a user selection (e.g., touching a user interface control button) to enter/exit this mode. In one or more implementations, the subject system may perform the switching automatically. For example, if the user manually moves the view (with the mouse, remote control, hand gestures, headset, etc. . . . ), then the view is updated to follow the user's request. If the user stopped making manual adjustments for a set amount of time, the view may drift back to the predetermined view.

In one or more implementations, multiple suggested views can be provided if appropriate and/or more than one suggested view may be rendered at a time. For example, for a football game, one view may track the quarterback, and other views may track the wide-receivers. Using the football example above, the user may have a split screen with 4 views at a time. Alternatively, different views may be used to track specific cars during a NASCAR racing event. The user may select from among these suggested views to customize their experience without needing to fully control the view the whole time.

If a suggested view is not available or appropriate for the entire scene, suggestions (or recommendations) may be given to try to ensure the viewer doesn't miss important action. A hint view (or preview) may be provided at the start of a new scene. The view may then be shifted to look at the hint angle in order to center the view on the main action. In one or more implementations, if the user desires to be less direct (or independent), on-screen graphic arrows may be used to indicate that the user may be facing the wrong way and missing out on something interesting.

Figure 16:
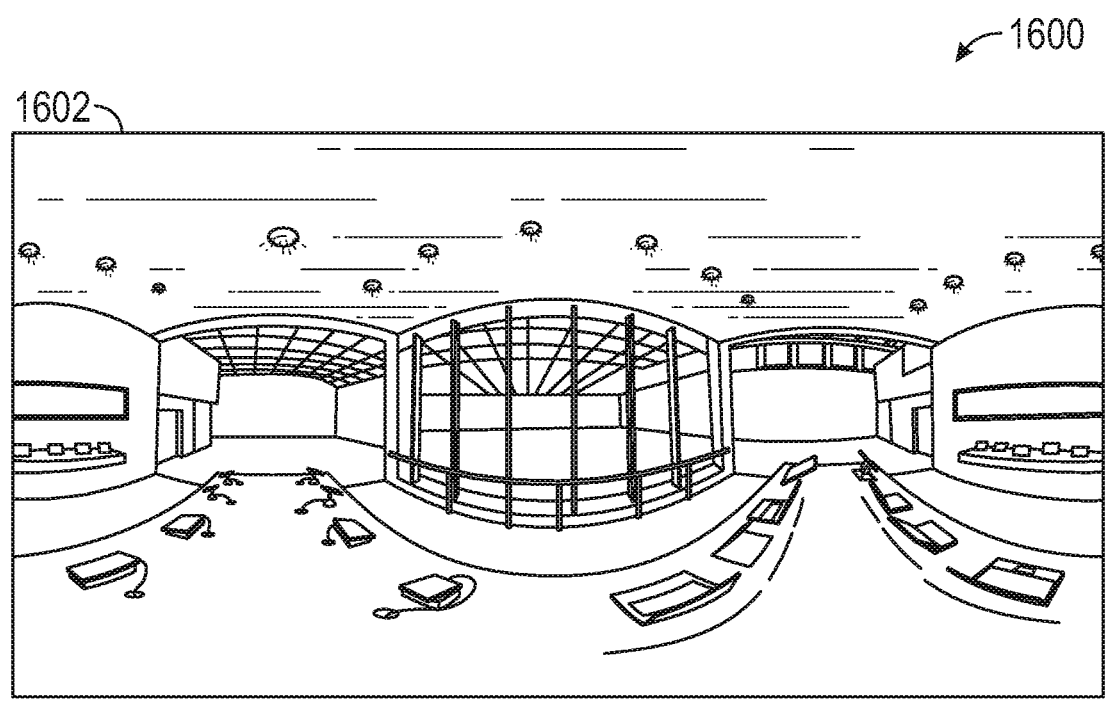
FIG. 16 conceptually illustrates examples of equirectangular and cubic projection.
Figure 16:
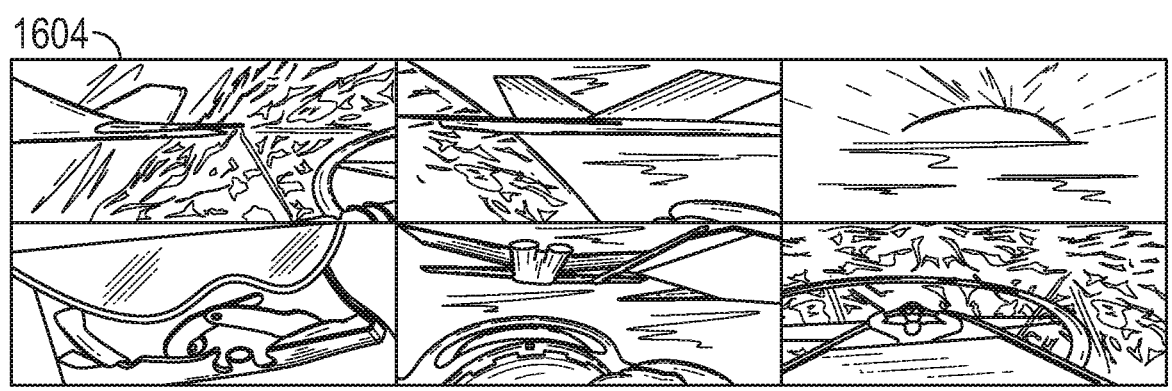

Two common types of projection are equirectangular projection and cubic projection. These types of projections map video from a sphere (equirectangular) and a cube (cubic) onto a flat 2D plane. Examples are shown in FIG. 16, which illustrates examples of equirectangular projection (e.g., 1602) and cubic projection (e.g., 1604).

Figure 17:
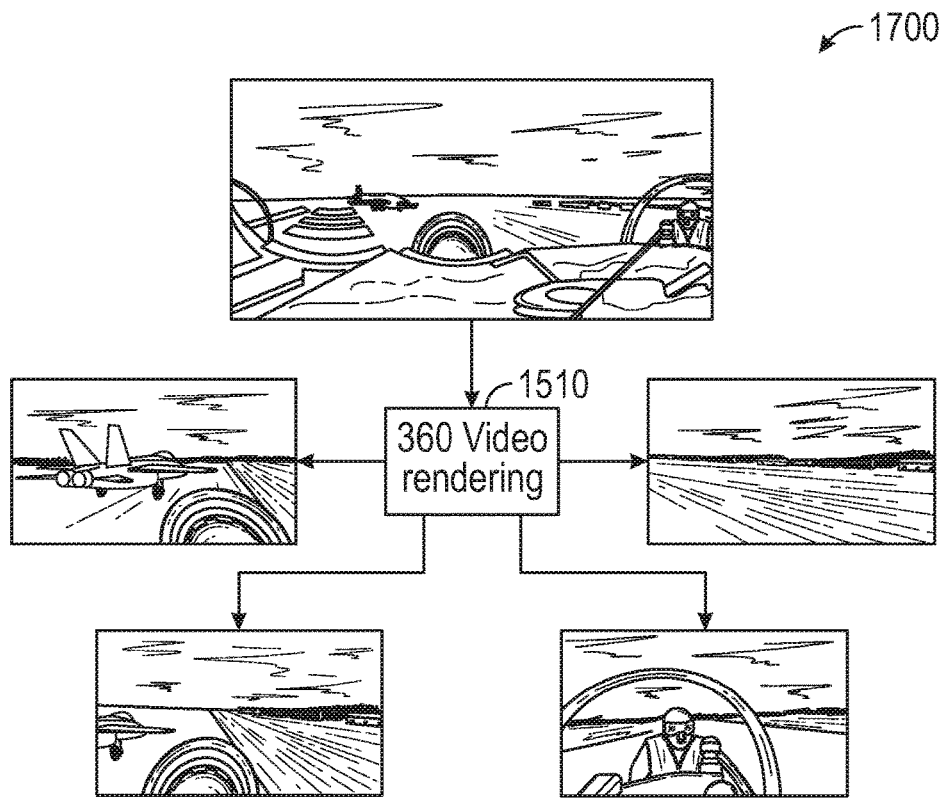
FIG. 17 conceptually illustrates an example of 360 degree video rendering.

FIG. 17 conceptually illustrates an example of 360 degree video rendering 1700. The video rendering device 1510 may receive a 360 degree video bitstream as input and render multiple regions of the 360 degree video with respective direction angles on the 2D plane.

At the moment, most 360 degree video content is viewed on computers or smartphones from streaming media services (YOUTUBE, FACEBOOK, HULU, etc.). However, it is expected that 360 degree video can be broadcast on standard cable/satellite networks in the near future. Sporting events, travel shows, extreme sports, movies, and many other types of programs may be shown in 360 degree video to raise user interest and engagement.

In any broadcast DVR (digital video recording) type environment, broadcast programs are recorded to replay at a later time. Particularly for 360 degree video, there can be enjoyment from watching a scene multiple times in order to experience the scene in a different direction or track something else interesting through the scene.

For 360 degree video, the concept of "recording" can be defined ways: 1) record the full view 360 degree video to watch again later (and choose a different view next time) (hereinafter "Definition (1)"); 2) record specific view as it was watched by a user during a specific viewing or viewings (hereinafter "Definition (2)"); and 3) record both the full view 360 degree video and a specific view as it was watched by a user (hereinafter "Definition (3)"). Recording based on Definition (3) may provide functionality of recording based on definition (1) and (2). In some implementations, the recording may be defined as recording both a specific view being watched by a user and another view that is being tracked in a background process by an object tracking engine.

Recording based on Definition (1), the audio/video can be stored to a storage device (e.g., volatile memory, non-volatile memory) and played back in the same manner as any normal program. In some aspects, the 360 video format may be converted from one projection format to another projection format (e.g., equirectangular to cubic), for example, if a display device (e.g., 1512) prefers one of these formats over another. In this example, the recording and playback may be no different from any regular audio/video stream.

Recording based on Definition (2) may allow the user to record their experience as they watch the video content the first time, and then recreate that exact same experience in a subsequent viewing. This may be useful if the user was satisfied with their view angles the previous time they watched a scene and desire to watch the scene again without additional effort or involvement.

Figure 18:
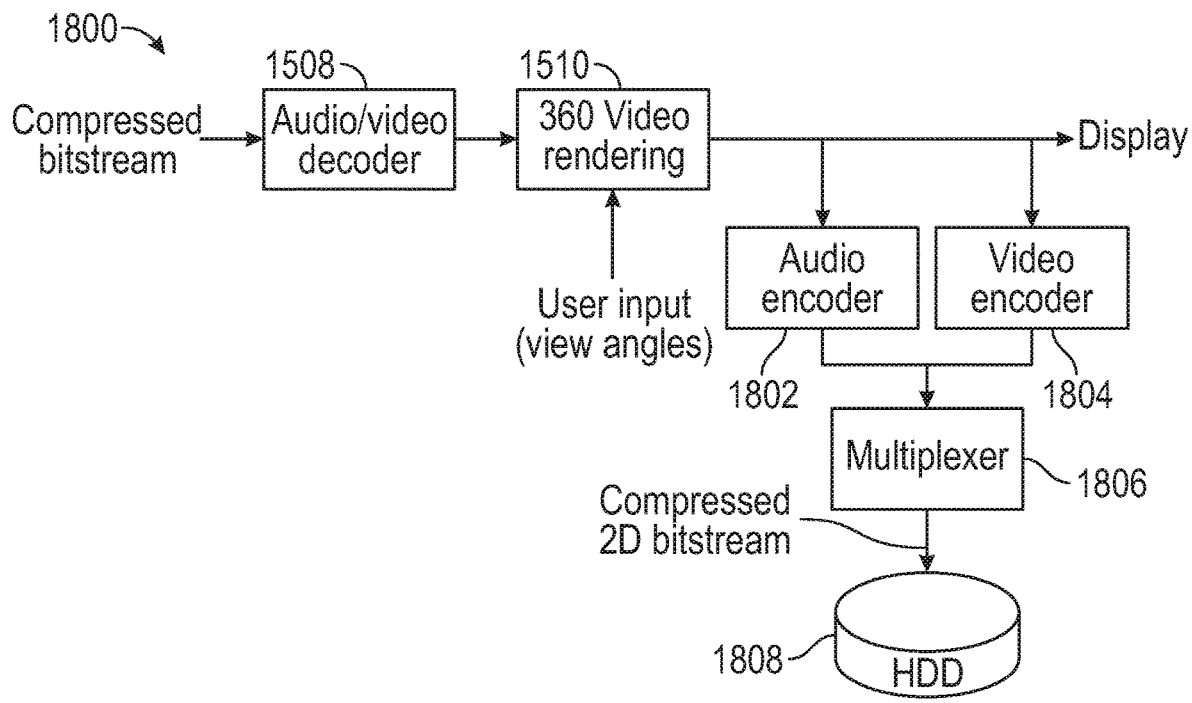
FIG. 18 illustrates a block diagram of an example of encoding a specific two-dimensional (2D) view from a 360 degree video stream.

FIG. 18 illustrates a block diagram 1800 of an example of encoding a specific 2D view from a 360 degree video stream. The most brute-force approach to record a previous view would be to re-encode a standard 2D video as it was viewed by the user. This would involve capturing the 2D image output from the 360 degree video rendering process, and passing it through a video encoder. The audio would also need to be re-encoded to achieve the correct mixing of left/right/center/back audio to match the video direction. After this process, the video may be watched on any client, without requiring a 360 degree video rendering process. This process is illustrated in FIG. 18.

In FIG. 18, a compressed bitstream (e.g., the 360 degree video stream) is received at the video decoding device 1508 as input and is decoded into a decoded stream. The video rendering device 1510 receives the decoded video stream as input and renders the received stream. The video rendering device 1510 may receive a user input that includes one or more view angles defined by a user. The rendered stream is re-encoded by audio and video components using an audio encoder 1802 and a video encoder 1804, respectively. Their respective output is then fed to a multiplexer 1806 to be combined into a compressed 2D bitstream and stored in a storage device 1808.

However, the re-encode processing is expensive in terms of hardware and, and if the user wants the flexibility to keep the full 360 degree version as well, the generated 2D view would consume extra space for storage. Instead, the subject technology describes a methodology to achieve the recording and playback based on Definitions (1) (2) and (3) without significant storage space or processing overhead.

Referring back to FIG. 10, the concept of recording a user's view at any given time can be expressed as FOV angles, and three different viewing direction is defined by rotation angles of the 3D viewing coordinate system (x', y', z') relative to the 3D capture coordinate system (x,y,z). As shown in FIG. 10, the viewing direction is dictated by the clockwise rotation angle θ along y axis (e.g., 1002, yaw), the counterclockwise rotation angle γ along x axis (e.g., 1004, pitch), and the counterclockwise rotation angle E along z axis (e.g., 1006, roll).

As a means to efficiently store the data needed to record/playback in the sense of Definition (2) and (3) above, the FOV angles, and the "yaw", "pitch", and "roll" angles can be saved for each frame. Combined with the data already recorded for Definition (1) (the original full 360 degree view data), any previously saved view can be recreated.

Figure 19:
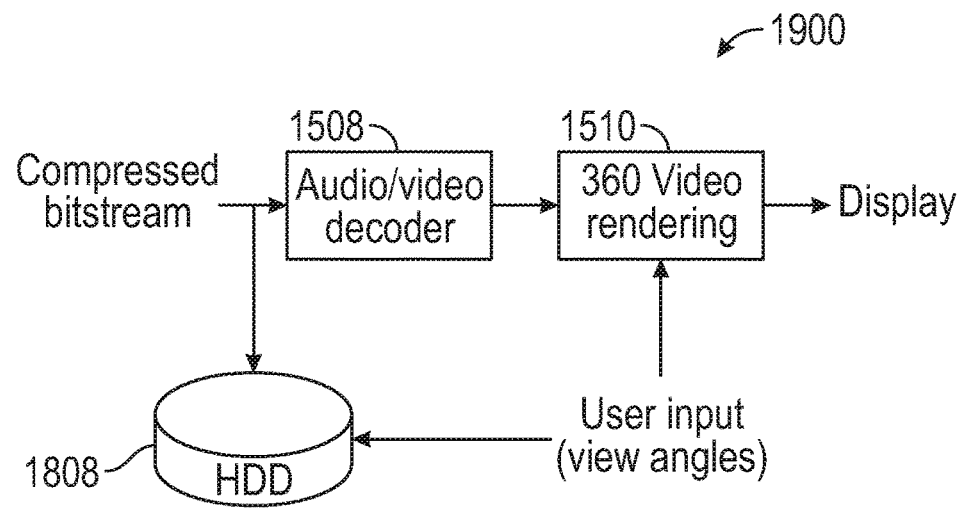
FIG. 19 illustrates a block diagram of an example of recording a 360 degree video stream including a specific set of view angles.

FIG. 19 illustrates a block diagram 1900 of an example of recording a 360 degree video stream including a specific set of view angles. In FIG. 19, a compressed bitstream (e.g., the 360 degree video stream) is received at the video decoding device 1508 as input and is decoded into a decoded stream. The video rendering device 1510 receives the decoded video stream as input and renders the decoded stream for display. The video rendering device 1510 may receive a user input as viewing history data that includes one or more view angles defined by a user. In some aspects, the user input also includes one or more user-selected field of view angles. Both the compressed bitstream and the received user input are stored in the storage device 1808 such that a playback sequence can be reconstructed using a specific viewing angle sequence set by the user. In some aspects, the compressed bitstream may include one or more predetermined view angles. In this respect, the video rendering device 1510 may select between the predetermined view angles and the user-selected view angles for rendering the decoded video stream.

Figure 20:
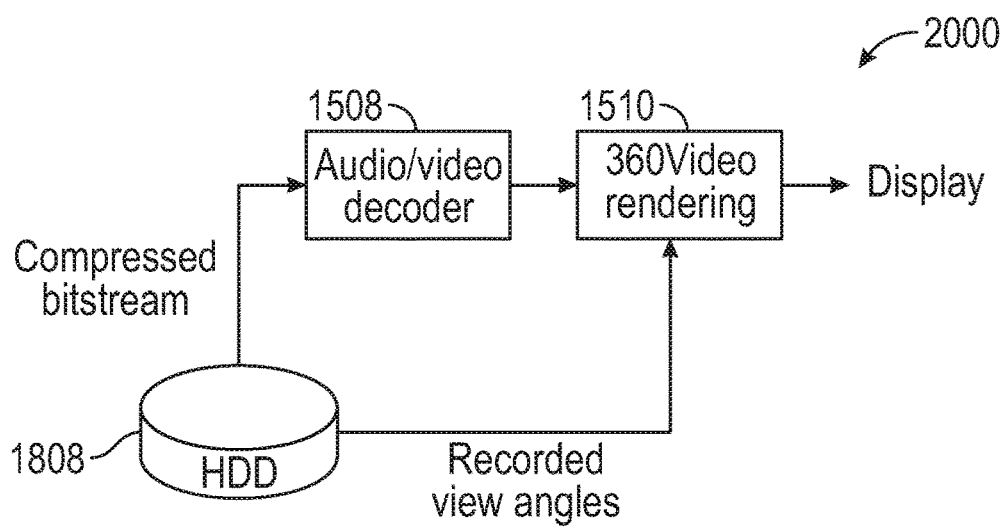
FIG. 20 illustrates a block diagram of an example of playback of a 360 degree video stream with recorded view angles.

FIG. 20 illustrates a block diagram 2000 of an example of playback of a 360 degree video stream with recorded view angles. In one or more implementations, the FOV angles, and the "yaw", "pitch", and "roll" angles ("the view angle data") is saved in the storage device 1808 for each frame. This view angle data may be stored in any number of ways. For example, as a separate file to be saved with a video sequence of the compressed bitstream, the view angle data may be inserted into the compressed bitstream as picture user data (e.g., AVC/HEVC supplemental enhancement info message (or SEI messages)), or carried as a separate stream of data within the video sequence (e.g., different MPEG-2 TS PID, or MP4 data stream).

Assuming the user wanted to store the full 360 degree version for a subsequent playback session, storing at least one view angle per frame may require a relatively small amount of overhead to enable this feature.

In FIG. 20, a compressed bitstream (e.g., the 360 degree video stream) is obtained by the video decoding device 1508 as input from the storage device 1808 and is decoded into a decoded stream. The video rendering device 1510 receives the decoded video stream as input and renders the decoded stream for display using recorded view angles from the storage device 1808. In FIG. 20, the 360 degree video stream may be encoded with multiple predetermined view angles set by a content provider. In another example, the recorded view angles may be user-selected view angles from a prior rendering session of the 360 degree video stream.

Figure 21:
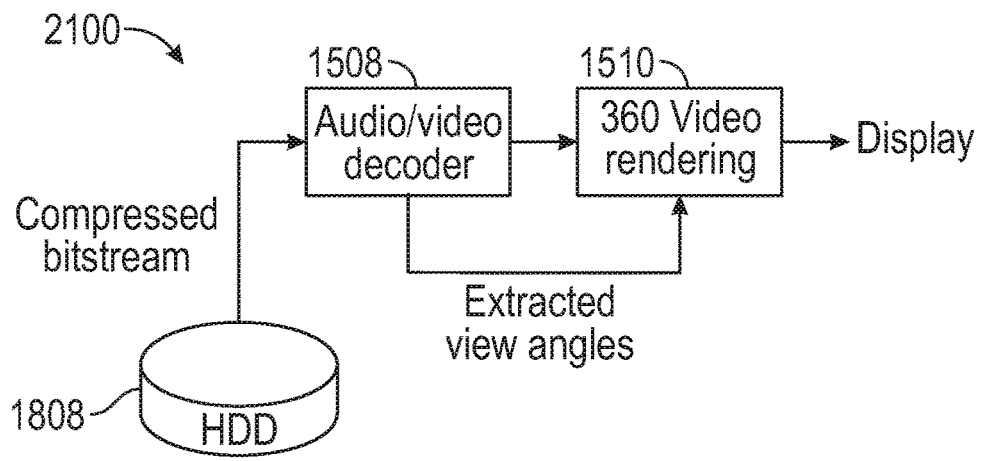
FIG. 21 illustrates a block diagram of an example of extraction of view angles from a compressed bitstream.

FIG. 21 illustrates a block diagram 2100 of an example of extraction of view angles from a compressed bitstream. In applications where the view angles are stored within the compressed bitstream itself, a view angle extraction process may be used. For example, the video decoder may extract view angles from the SEI messages within an HEVC bitstream.

In FIG. 21, a compressed bitstream (e.g., the 360 degree video stream) is obtained by the video decoding device 1508 as input from the storage device 1808 and is decoded into a decoded stream. The video decoding device 1508 may extract predetermined view angles including predetermined field of view angles from the decoded video stream. In some examples, the video decoding device 1508 may extract the predetermined view angles from one or more supplemental enhancement information messages within the decoded video stream. The video rendering device 1510 receives the decoded video stream along with the extracted view angles as input, and renders the decoded stream for display using the extracted view angles. In this example, the video rendering device 1510 receives the decoded video stream separately from the extracted predetermined view angles over respective channels.

This approach may allow the user to enjoy a previous experience again, but since the full 360 degree video is also available, if the user wanted to deviate from the predetermined (or suggested) view angle and change the view angle manually, the user may do so seamlessly at any given point in the playback sequence. The user's manual input may override the recorded values (or corresponding predetermined view angles) and drive the view however they choose.

In one or more implementation, when a user initiates control of the rendered view but gets bored after a while; the system may drift back to the previous view angle setting upon detecting that the user has stopped manually controlling the view angle after a predetermined period of time. In other aspects, the user may select a control button to revert back to a playback mode where the recorded view is rendered again once the user has completed the manual control of the view angle.

Most 360 degree view applications do not allow the user to adjust the "roll" angle. The camera is typically fixed in a vertical orientation. The view, however, can be rotated up/down, and left/right, but not turned sideways. In this respect, the subject technology may apply to a use case where a system recorded two of the three possible view angles.

Note that not all "360 video" streams cover a full 360°× 180° field of vision. Some sequences may restrict viewing to the front direction (180°×180°). Some may have limitations about how high up or down a user may navigate. In this respect, the subject technology may apply to each of these use cases.

In one or more implementations, a 360 degree video playback system (e.g., 1500) has capability of memorizing the 360 degree video rendering settings (i.e. FOV angles, viewing direction angles, rendering picture size, etc.) immediately before the playback is terminated or switched to another program channel, so that the memorized rendering settings may be used when the playback of the same channel is resumed.

Object Tracking

While a 360 degree video application may be fruitful experience to be immersed in a scene, for longer programs, the need to manually control the view at all times to track the main objects of interest can often grow tiresome. For example, it may be interesting to look around once and awhile during a sporting event, but after a while the user just wants to center the view on the ball, a specific player, a certain race car, etc. For this purpose, object tracking can be used to track objects of interest and keep these objects centered in the frame.

Object tracking has been an area of research for many years. Applications such as video surveillance, video compression, medical imaging, all attempt to track objects as they move from frame to frame. In the subject technology, standard object tracking algorithms that recognize 360 degree video format boundaries may be used.

Figure 22:
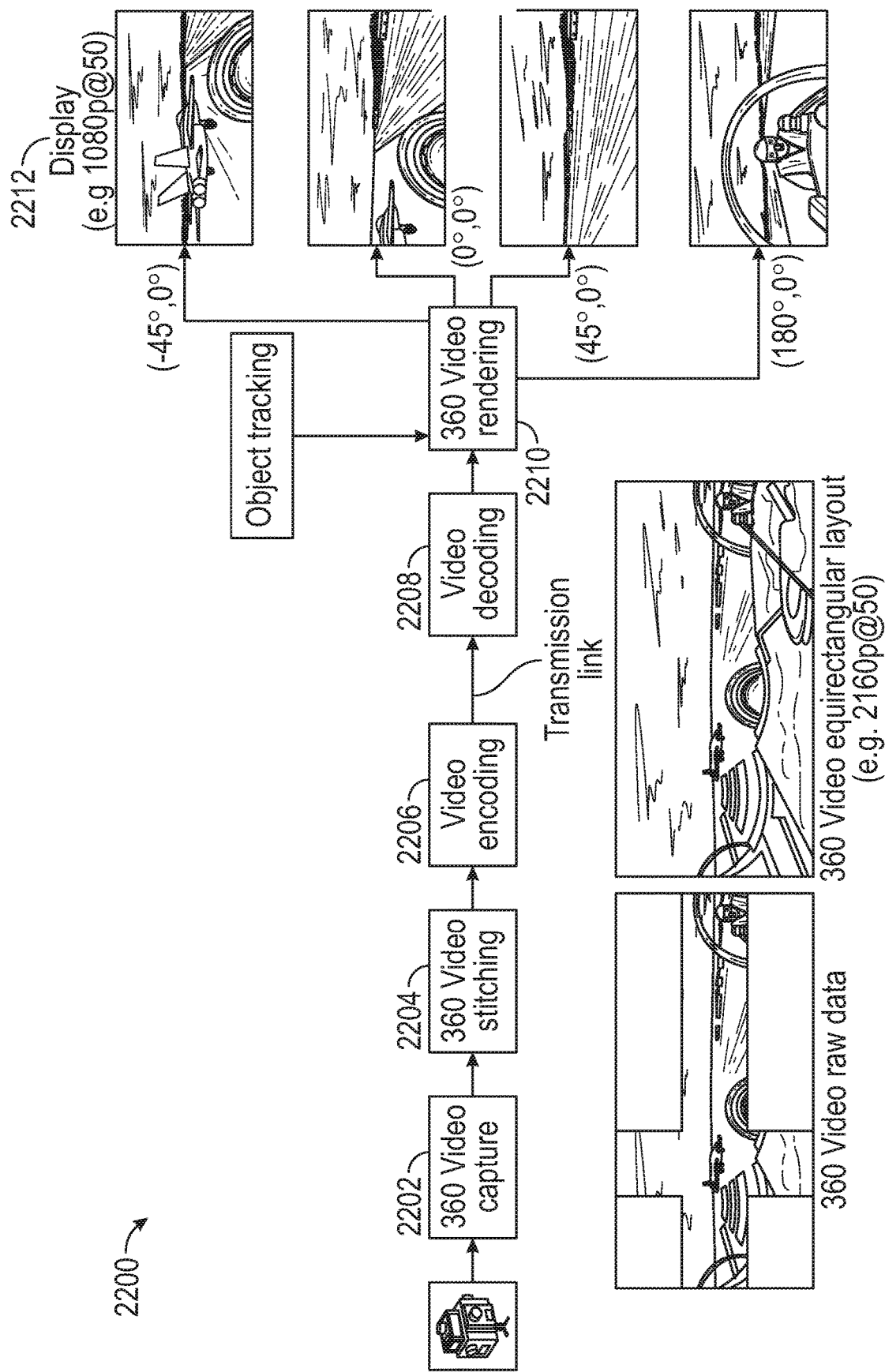
FIG. 22 illustrates an example network environment in which object tracking for 360 degree video can be implemented in accordance with one or more implementations.

FIG. 22 illustrates an example network environment 2200 in which object tracking for 360 degree video can be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The example network environment 2200 includes a 360 video capture device 2202, a 360 video stitching device 2204, a video encoding device 2206, a video decoding device 2208, an object tracking device 2214, and a 360 video rendering device 2210. In one or more implementations, one or more of the devices 2202, 2204, 2206, 2208, 2210, 2214 may be combined into the same physical device. For example, the 360 video capture device 2202, the 360 video stitching device 2204, and the video encoding device 2206 may be combined into a single device, and the video decoding device 2208, object tracking device 2214, and the 360 video rendering device 2210 may be combined into a single device. The video decoding device 2208 may include an audio decoding device (not shown) in some embodiments, or the video decoding device 2208 may be communicably coupled to a separate audio decoding device in other embodiments, for processing an incoming or stored 360 video compressed bitstream.

On the 360 video playback side, the network environment 2200 may further include a demultiplexer device (not shown) that may demultiplex the incoming 360 video compressed bitstream, and provide the demultiplexed bitstream respectively to the video decoding device 2208 and to the audio decoding device. In some aspects, the demultiplexer device may be configured to de-compress the 360 video bitstream. An object tracking device 2214 may be coupled to the video decoding device 2208 and the audio decoding device for tracking objects in the 3D space of the decoded 360 video bitstream. In this respect, tracking angles may be provided from the object tracking device to the video rendering device 2210 for rendering the 360 video content using object tracking. The network environment 2200 may further include a 360 video layout format conversion device (not shown) that may perform 360 video layout format conversion before the video encoding by the video encoding device 2206 and/or after the video decoding by the video decoding device 2208. The network environment 2200 may also include a 360 video playback device (not shown) that plays back the rendered 360 video content. In one or more implementations, the video encoding device 2206 may be communicatively coupled to the video decoding device 2208 via a transmission link, such as over a network.

In the subject system, object tracking can be used to track objects of interest and keep these objects centered in a frame of a 360 degree video. The FOV angles, and the "yaw", "pitch", and "roll" angles (view angle data) can be saved in the storage device for each frame. Some 360 degree view applications may not allow the user to adjust the "roll" angle. The camera is typically fixed in a vertical orientation. The angle can be rotated up/down, and left/right, but not turned sideways. Therefore, to center the view on the object of interest, the yaw and pitch may be set to align the view angle with the vector pointing to the center of the object of interest.

Switching between the tracking view and the manual view may include prompting the user to provide a user selection (e.g., pushing a button) to enter/exit this mode. The object detected most closely to the center of the current view may be tracked. Alternatively, with an input device (e.g., mouse, remote control, or voice command), the system may lock on to whatever the user selected in the scene.

Alternatively, the subject system may perform the manual/tracking switch automatically. For example, if the user manually moves the view (with the mouse, remote control, hand gestures, headset, etc.), the view is updated to follow the user's request. If the user stopped making manual adjustments for a set amount of time, the view may begin to track whatever is closest to the middle of the scene at that time.

There are thousands of algorithms proposed for object tracking, with various degrees of success (e.g., point tracking, kernel tracking, boundary tracking). Each of these track features such as color, edges, optical flows, textures, and so on. The object tracking algorithms all have their own strengths and weaknesses and they can vary immensely in computational requirements.

The disclosed system does not attempt to suggest that one algorithm for object tracking is more appropriate. It may depend greatly on the type of objects being tracked and the computational power available on the object tracking device 2214 (i.e. the set-top-box).

Object detection in 360 degree video is not drastically different than object detection in 2D video. The object detection would typically be done on the 2D projection data (equirectangular, cubic projection, etc.) rather than attempting object tracking in 3D space.

Figure 23:
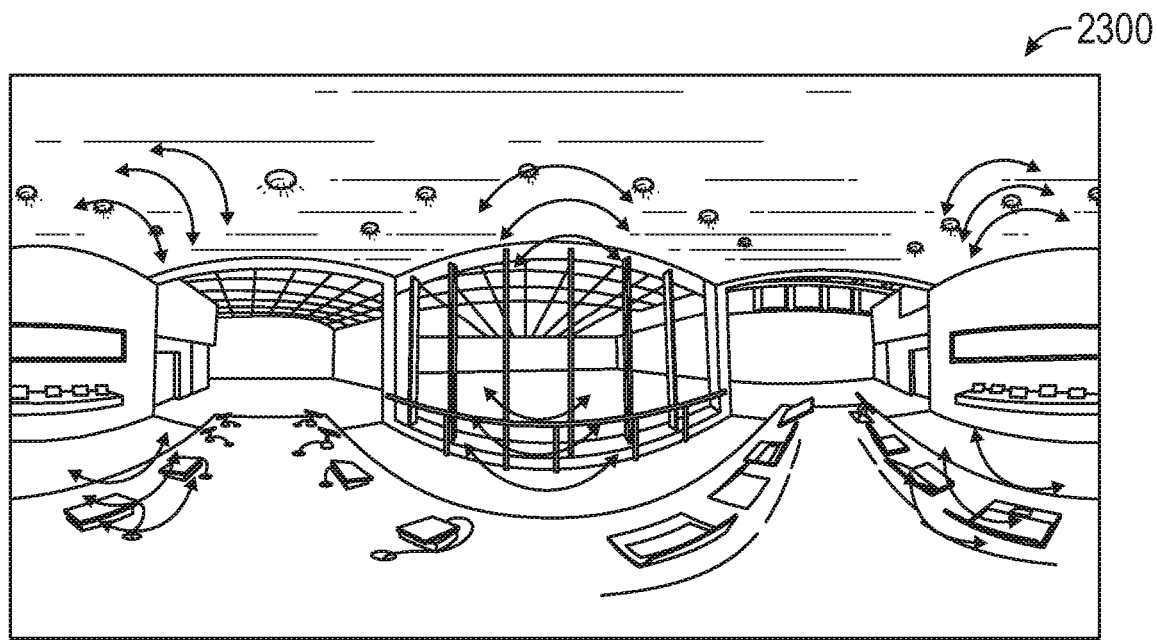
FIG. 23 conceptually illustrates an example of spherical distortions in equirectangular projection.

FIG. 23 conceptually illustrates an example of spherical distortions in equirectangular projection 2300. With the equirectangular projection 2300, the 2D projection is a single continuous space. The 2D projection may allow for traditional tracking algorithms to be implemented. However, the spherical warping, particularly near the poles may cause problems for some tracking algorithms. For example, objects may become stretched and distorted as they approach the poles, and linear motion may become more curved and circular.

Figure 24:
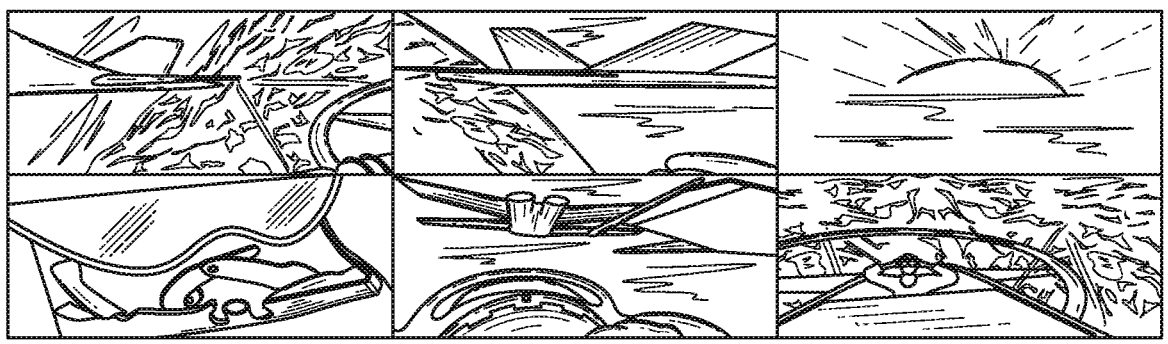
FIG. 24 conceptually illustrates an example of face discontinuities in cubic projection.

FIG. 24 conceptually illustrates an example of face discontinuities in a cubic projection space 2400. To work in the cubic-projection space 2400, the tracking algorithm may need to be aware of face boundaries and have an understanding of how each face is connected to its neighboring faces. As an object is moved from one face to the next face, the tracking algorithm may need to understand its face boundaries and track that motion continuously.

Once the object is tracked in the 2D projection space, this can be mapped back to a point/vector in 3D space. This may be done using the same reverse-projection algorithms used to map the 2D projection to the 3D surface.

Additionally, surround sound audio can potentially provide additional tracking data to help improve the accuracy in the object tracking. The surround sound audio may provide audio signals known to be coming from the right/bottom/left/front/top/back directions. These audio signals with directional information may be the same type of information provided by a microphone array. Such arrays can be used to isolate and detect sources of sound in 3D space. Assuming the object being tracked is a source for a sound, tracking the source of the sound through space/time can provide for improvements in the accuracy of the tracking algorithm.

In reference to FIG. 10, many 360 degree view applications do not allow the user to adjust the "roll" angle. The camera is typically fixed in a vertical orientation. It can be rotated up/down, and left/right, but not turned sideways. Therefore, to center the view on the object of interest, the yaw and pitch may be set to align the view angle with the vector pointing to the center of the object of interest.

Figure 25:
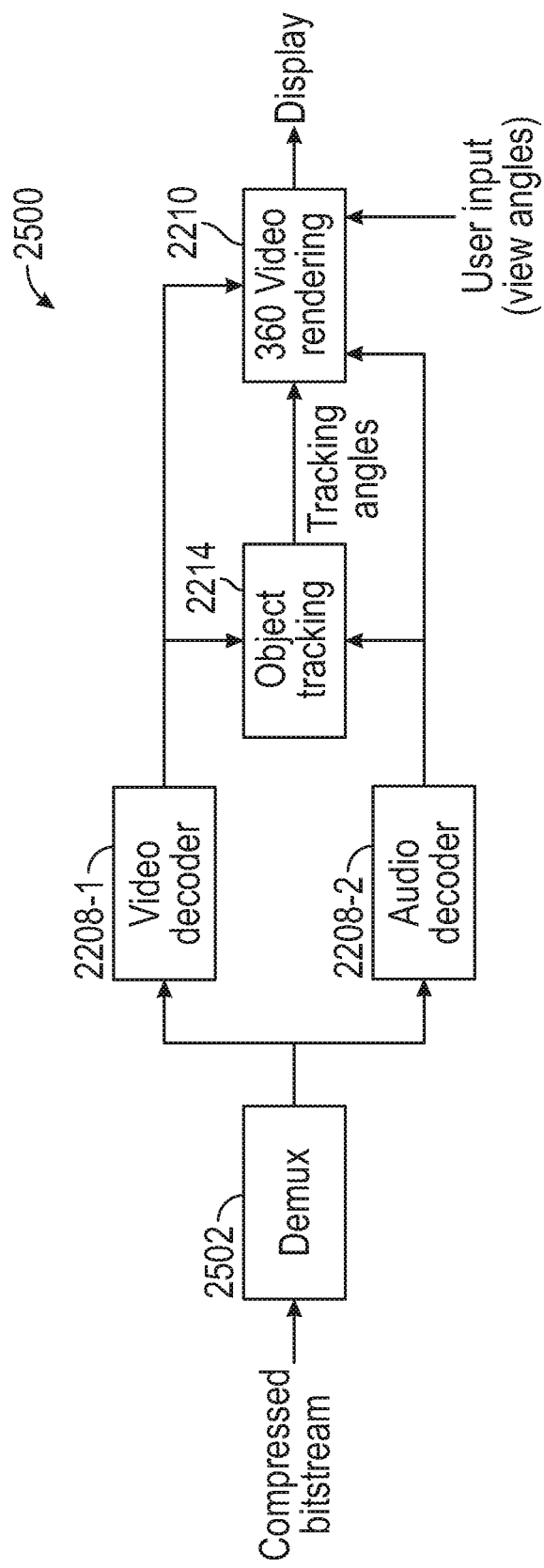
FIG. 25 illustrates a block diagram of an example of a 360 degree rendering system with object tracking.

FIG. 25 illustrates a block diagram 2500 of an example of a 360 degree rendering system using object tracking. In FIG. 25, a compressed bitstream (e.g., the 360 degree video stream) is received at a demultiplexer 2502 as input and demultiplexed into respective streams of data (e.g., video stream, audio stream). In this example, the demultiplexed bitstream may be received by respective decoders on separate channels. For example, the video stream portion of the compressed bitstream may be received and decoded by a video decoder 2208-1, and the audio stream portion may be received and decoded by an audio decoder 2208-2. An object tracking device 2214 may receive both the video and audio streams from the decoders 2208-1 and 2208-2, respectively, and track one or more objects in the decoded 360 degree video stream. The object tracking device 2214 may provide one or more tracking angles associated with the one or more objects to the video rendering device 2210. In some aspects, the object tracking device 2214 may detect objects that are closest to the center of a current view. In other aspects, the object tracking device 2214 may lock onto an object based on the user selecting the object on display in the scene via an input device (e.g., mouse).

The video rendering device 2210 receives the decoded video stream and decoded audio stream as input and renders the decoded stream for display. The video rendering device 2210 also receives the tracking angles from the object tracking device 2214 as input. The video rendering device 2210 also receives a user input that includes one or more view angles defined by a user through a user input device (e.g. mouse, remote control, etc. . . . ). In some aspects, the user input also includes one or more user-selected field of view angles. In this respect, the video rendering device 1510 may select between the tracking angles and the user-selected view angles for rendering the decoded video stream. The object tracking device 2214 may accept different forms of user input to initiate the tracking of objects in a scene including, but not limited to, user eye movement data, user head movement data, voice recognition data, and the like.

In one or more implementations, the video rendering device 2210 may receive a set of user-selected view angles as input. The video rendering device 2210 may select between the set of user-selected view angles and tracking angles from the object tracking device 2214. The video rendering device 2210 may render one or more video sequences of the decoded 360 degree video stream with one or more view angles from the set of user-selected view angles when the set of user-selected view angles is selected over the tracking angles. In some aspects, the one or more video sequences are rendered back with one or more suggested tracking angles after a predetermined period of time of user inactivity.

Switching between the tracking angles and the user-selected view angles may be triggered by a user interface control command that switches between display modes of the rendered streams. In one or more implementations, the manual/tracking switch may be done automatically (e.g., without user input). For example, if the user manually moves the view (with the mouse, remote control, hand gestures, headset, etc.), the view is updated to follow the user's request. If the user stopped making manual adjustments for a set amount of time, the view may begin to track any object that is closest to the middle of the scene at that time.

Using split-screens on a display device (e.g., 2212), more than one suggested view may be tracked at a time. For example, the user may have a split screen with four (4) different views being displayed concurrently, where one predetermined view tracks a first object (e.g., the quarterback of a football team), another predetermined view tracks a second object(s) (e.g., wide receivers of the football team), while another view is being controlled manually by the user via the user-selected view angles.

Note that not all "360 video" streams actually cover the full 360°×180° field of vision. Some sequences may restrict the viewing direction to the front direction (180°×180°). Some may have limitations about how high up or down a user may alter the viewing direction. In this respect, the object tracking device 2214 may accommodate the viewing direction restrictions set by some applications.

Figure 26:
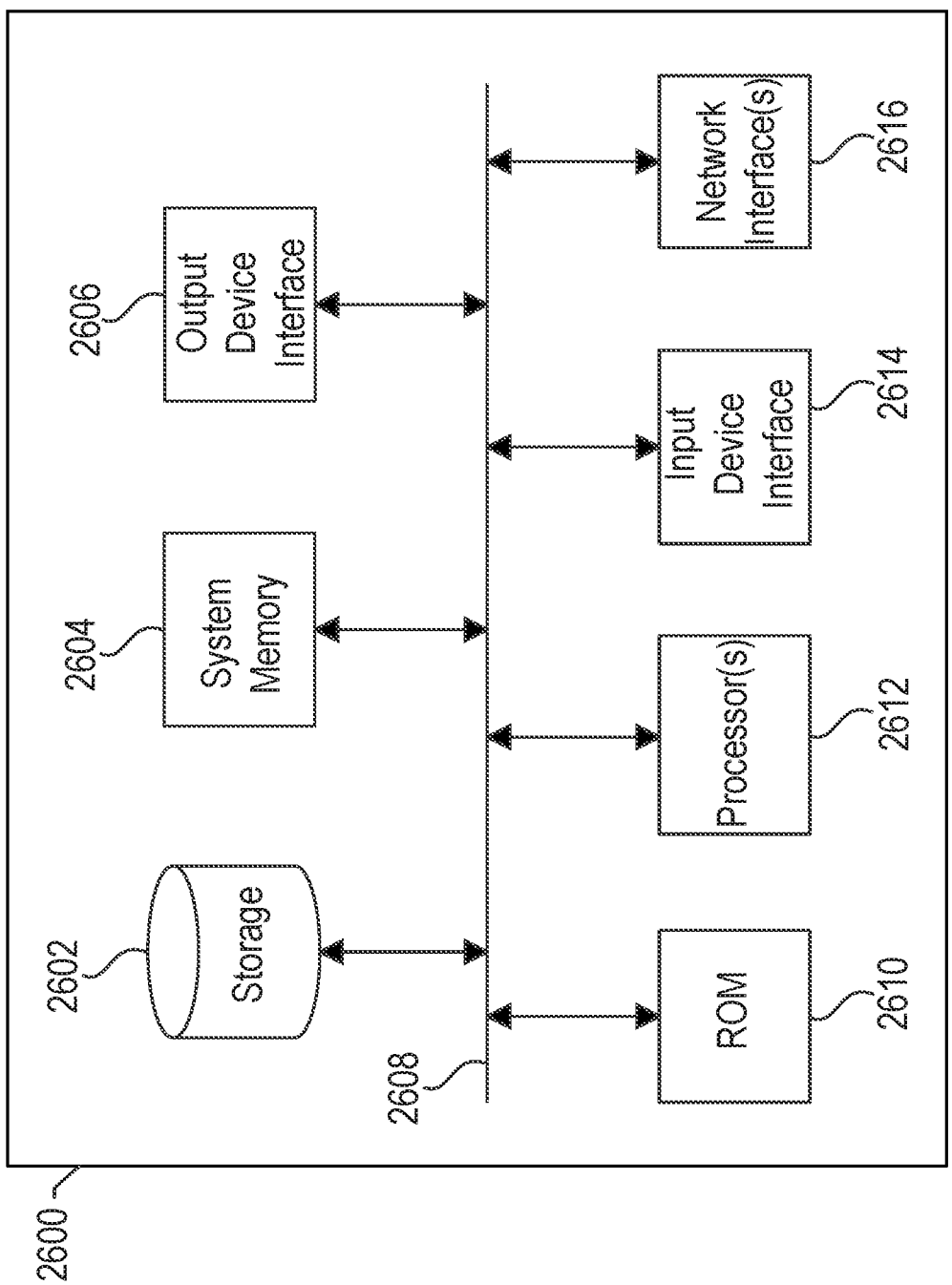
FIG. 26 conceptually illustrates an electronic system with which one or more implementations of the subject technology may be implemented.

FIG. 26 conceptually illustrates an electronic system 2600 with which one or more implementations of the subject technology may be implemented. The electronic system 2600, for example, can be a network device, a media converter, a desktop computer, a laptop computer, a tablet computer, a server, a switch, a router, a base station, a receiver, a phone, or generally any electronic device that transmits signals over a network. Such an electronic system 2600 includes various types of computer readable media and interfaces for various other types of computer readable media. In one or more implementations, the electronic system 2600 may be, or may include, one or more of the devices 102, 104, 106, 108, 110, the 360 degree video layout format conversion device, and/or the 360 degree video playback device. The electronic system 2600 includes a bus 2608, one or more processing unit(s) 2612, a system memory 2604, a read-only memory (ROM) 2610, a permanent storage device 2602, an input device interface 2614, an output device interface 2606, and a network interface 2616, or subsets and variations thereof.

The bus 2608 collectively represents all system, peripheral, and chipset buses that communicatively connect the numerous internal devices of the electronic system 2600. In one or more implementations, the bus 2608 communicatively connects the one or more processing unit(s) 2612 with the ROM 2610, the system memory 2604, and the permanent storage device 2602. From these various memory units, the one or more processing unit(s) 2612 retrieves instructions to execute and data to process in order to execute the processes of the subject disclosure. The one or more processing unit(s) 2612 can be a single processor or a multi-core processor in different implementations.

The ROM 2610 stores static data and instructions that are needed by the one or more processing unit(s) 2612 and other modules of the electronic system. The permanent storage device 2602, on the other hand, is a read-and-write memory device. The permanent storage device 2602 is a non-volatile memory unit that stores instructions and data even when the electronic system 2600 is off. One or more implementations of the subject disclosure use a mass-storage device (such as a magnetic or optical disk and its corresponding disk drive) as the permanent storage device 2602.

Other implementations use a removable storage device (such as a floppy disk, flash drive, and its corresponding disk drive) as the permanent storage device 2602. Like the permanent storage device 2602, the system memory 2604 is a read-and-write memory device. However, unlike the permanent storage device 2602, the system memory 2604 is a volatile read-and-write memory, such as random access memory. System memory 2604 stores any of the instructions and data that the one or more processing unit(s) 2612 needs at runtime. In one or more implementations, the processes of the subject disclosure are stored in the system memory 2604, the permanent storage device 2602, and/or the ROM 2610. From these various memory units, the one or more processing unit(s) 2612 retrieves instructions to execute and data to process in order to execute the processes of one or more implementations.

The bus 2608 also connects to the input device interface 2614 and the output device interface 2606. The input device interface 2614 enables a user to communicate information and select commands to the electronic system. Input devices used with the input device interface 2614 include, for example, alphanumeric keyboards and pointing devices (also called "cursor control devices"). The output device interface 2606 enables, for example, the display of images generated by the electronic system 2600. Output devices used with the output device interface 2606 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 26, the bus 2608 also couples the electronic system 2600 to one or more networks (not shown) through one or more network interfaces 2616. In this manner, the computer can be a part of one or more network of computers (such as a local area network ("LAN"), a wide area network ("WAN"), or an Intranet, or a network of networks, such as the Internet. Any or all components of the electronic system 2600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A computer-implemented method comprising:
   decoding a 360 degree video stream;
   tracking and object detected in the decoded 360 degree video stream and providing one or more tracking angles associated with the detected object;
   extracting a plurality of predetermined view angles from the decoded 360 degree video stream;
   rendering the decoded 360 degree video stream using the one or more tracking angles; and
   provide, for display, the rendered 360 degree video stream,
   wherein the object is detected as being closest to a center view of the 360 degree video stream.

2. The computer-implemented method of claim 1, the method further comprising:
   receiving a set of user-selected view angles as input; and
   rendering one or more video sequences of the decoded 360 degree video stream with the set of user-selected view angles.

3. A system comprising:
   a decoding device configured to receive a 360 degree video stream as input and decode the 360 degree video stream;
   an object tracking device configured to track an object detected by the object tracking device as being closest to a center of a current view in the decoded 360 degree video stream and provide one or more tracking angles associated with the detected object; and
   a rendering device configured to render the decoded 360 degree video stream using the one or more tracking angles from the object tracking device to keep the detected object in a rendered view for one or more rendered frames.

4. The system of claim 3, wherein the rendering device is further configured to:
   receive one or more user-selected view angles as input;
   render the decoded 360 degree video stream with the one or more user-selected view angles.

5. The system of claim 3, wherein the rendering device is further configured to render the decoded 360 degree video stream back with the one or more tracking angles after a predetermined period of time of user inactivity.

6. The method of claim 2, wherein the one or more video sequences are rendered back with one or more view angles from the plurality of predetermined view angles after a predetermined period of time of user inactivity.

7. The system of claim 3, wherein the object is detected by the object tracking device in response to user input.

8. The system of claim 7, wherein the user input is a selection to enter a tracking mode.

9. The system of claim 3, wherein the detected object is detected by the object tracking device as closest to a center of current view of the rendered 360 degree video stream after a predetermined period of user inactivity.

10. The method of claim 1, wherein the object is detected by the object tracking device in response to user input.

11. The method of claim 10, wherein the user input is a selection to enter a tracking mode.

12. The method of claim 1, wherein the detected object is detected by the object tracking device as closest to a center of current view of the rendered 360 degree video stream after a predetermined period of user inactivity.

* * * * *